US008467768B2

(12) United States Patent  
Mahaffey et al.

(10) Patent No.: US 8,467,768 B2
(45) Date of Patent: Jun. 18, 2013

(54) SYSTEM AND METHOD FOR REMOTELY SECURING OR RECOVERING A MOBILE DEVICE

(75) Inventors: Kevin Mahaffey, San Diego, CA (US); John G. Hering, Newport Beach, CA (US); James Bergess, Los Angeles, CA (US)

(73) Assignee: Lookout, Inc., San Francisco, CA (US)

( * ) Notice: Subject to any disclaimer, the term of this patent is extended or adjusted under 35 U.S.C. 154(b) by 511 days.

(21) Appl. No.: 12/372,719

(22) Filed: Feb. 17, 2009

(65) Prior Publication Data

US 2010/0210240 A1 Aug. 19, 2010

(51) Int. Cl.
*H04W 88/02* (2009.01)

(52) U.S. Cl.
USPC .......................................................... 455/411

(58) Field of Classification Search
USPC .................................. 455/410–411, 418–420
See application file for complete search history.

(56) References Cited

U.S. PATENT DOCUMENTS

| 3,416,032 | A | 12/1968 | Jahns et al. |
| 4,553,257 | A | 11/1985 | Mori et al. |
| 5,319,776 | A | 6/1994 | Hile et al. |
| 5,574,775 | A | 11/1996 | Miller, II et al. |
| 5,715,518 | A | 2/1998 | Barrere et al. |
| 6,185,689 | B1 | 2/2001 | Todd et al. |
| 6,269,456 | B1 | 7/2001 | Hodges et al. |
| 6,272,353 | B1 | 8/2001 | Dicker et al. |
| 6,301,668 | B1 | 10/2001 | Gleichauf et al. |
| 6,453,345 | B2 | 9/2002 | Trcka et al. |
| 6,529,143 | B2 | 3/2003 | Mikkola et al. |
| 6,696,941 | B2 | 2/2004 | Baker |
| 6,792,543 | B2 | 9/2004 | Pak et al. |
| 6,892,225 | B1 | 5/2005 | Tu et al. |
| 6,907,530 | B2 | 6/2005 | Wang |
| 6,959,184 | B1 | 10/2005 | Byers et al. |

(Continued)

FOREIGN PATENT DOCUMENTS

| GB | 2430588 | 3/2007 |
| WO | 2007081356 | 7/2001 |

(Continued)

OTHER PUBLICATIONS

"Dashwire: Manage Your Cell Phone on the Web", News Blog, Jessica Dolcourt, Oct. 29, 2007 5:00 AM PDT, pp. 1-3.

(Continued)

*Primary Examiner* — Diane Mizrahi
(74) *Attorney, Agent, or Firm* — Dergosits & Noah LLP

(57) ABSTRACT

The present invention provides a system and method for remotely securing, accessing, and managing a mobile device or group of mobile devices. The invention enables a remote access web page to be generated by a server and displayed on a client computer. The server receives requested actions from the client computer and interacts with the mobile device to perform the actions. In the case of a lost or stolen device, the invention enables a user to take actions leading to the recovery or destruction of the device and data stored on it. The invention enables multiple types of remote access, including: locking the device, backing up data from the device, restoring data to the device, locating the device, playing a sound on the device, and wiping data from the device. The invention may be used to provide both self-help and administrator-assisted security for a device or group of devices.

28 Claims, 18 Drawing Sheets

U.S. PATENT DOCUMENTS

| | | |
|---|---|---|
| 7,020,895 B2 | 3/2006 | Albrecht |
| 7,023,383 B2 | 4/2006 | Stilp et al. |
| 7,069,589 B2 | 6/2006 | Schmall et al. |
| 7,096,368 B2 | 8/2006 | Kouznetsov et al. |
| 7,123,933 B2 | 10/2006 | Poor et al. |
| 7,127,455 B2 | 10/2006 | Carson et al. |
| 7,159,237 B2 | 1/2007 | Schneier et al. |
| 7,171,690 B2 | 1/2007 | Kouznetsov et al. |
| 7,178,166 B1 | 2/2007 | Taylor et al. |
| 7,181,252 B2 | 2/2007 | Komsi |
| 7,210,168 B2 | 4/2007 | Hursey et al. |
| 7,228,566 B2 | 6/2007 | Caceres et al. |
| 7,236,598 B2 | 6/2007 | Sheymov et al. |
| 7,237,264 B1 | 6/2007 | Graham et al. |
| 7,266,810 B2 | 9/2007 | Karkare et al. |
| 7,290,276 B2 | 10/2007 | Ogata |
| 7,304,570 B2 | 12/2007 | Thomas et al. |
| 7,305,245 B2 | 12/2007 | Alizadeh-Shabdiz |
| 7,308,256 B2 | 12/2007 | Morota et al. |
| 7,308,712 B2 | 12/2007 | Banzhof |
| 7,325,249 B2 | 1/2008 | Sutton et al. |
| 7,356,835 B2 | 4/2008 | Gancarcik et al. |
| 7,376,969 B1 | 5/2008 | Njemanze et al. |
| 7,386,297 B2 | 6/2008 | An |
| 7,392,043 B2 | 6/2008 | Kouznetsov et al. |
| 7,392,543 B2 | 6/2008 | Szor |
| 7,397,424 B2 | 7/2008 | Houri |
| 7,397,434 B2 | 7/2008 | Mun et al. |
| 7,401,359 B2 | 7/2008 | Gartside et al. |
| 7,403,762 B2 | 7/2008 | Morgan et al. |
| 7,414,988 B2 | 8/2008 | Jones et al. |
| 7,415,270 B2 | 8/2008 | Wilhelmsson et al. |
| 7,433,694 B2 | 10/2008 | Morgan et al. |
| 7,467,206 B2 | 12/2008 | Moore et al. |
| 7,471,954 B2 | 12/2008 | Brachet et al. |
| 7,472,422 B1 | 12/2008 | Agbabian |
| 7,474,897 B2 | 1/2009 | Morgan et al. |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz |
| 7,525,541 B2 | 4/2009 | Chun et al. |
| 7,551,579 B2 | 6/2009 | Alizadeh-Shabdiz |
| 7,551,929 B2 | 6/2009 | Alizadeh-Shabdiz |
| 7,634,800 B2 | 12/2009 | Ide et al. |
| 7,685,132 B2 | 3/2010 | Hyman |
| 7,696,923 B2 | 4/2010 | Houri |
| 7,768,963 B2 | 8/2010 | Alizadeh-Shabdiz |
| 7,769,396 B2 | 8/2010 | Alizadeh-Shabdiz et al. |
| 7,774,637 B1 | 8/2010 | Beddoe et al. |
| 7,809,353 B2 | 10/2010 | Brown et al. |
| 7,809,366 B2 | 10/2010 | Rao et al. |
| 7,818,017 B2 | 10/2010 | Alizadeh-Shabdiz et al. |
| 7,835,754 B2 | 11/2010 | Alizadeh-Shabdiz et al. |
| 7,856,234 B2 | 12/2010 | Alizadeh-Shabdiz et al. |
| 7,856,373 B2 | 12/2010 | Ullah |
| 7,861,303 B2 | 12/2010 | Kouznetsov et al. |
| 7,907,966 B1 | 3/2011 | Mammen |
| 7,916,661 B2 | 3/2011 | Alizadeh-Shabdiz et al. |
| 7,991,854 B2 | 8/2011 | Bahl |
| 7,999,742 B2 | 8/2011 | Alizadeh-Shabdiz et al. |
| 8,014,788 B2 | 9/2011 | Alizadeh-Shabdiz et al. |
| 8,019,357 B2 | 9/2011 | Alizadeh-Shabdiz et al. |
| 8,031,657 B2 | 10/2011 | Jones et al. |
| 8,054,219 B2 | 11/2011 | Alizadeh-Shabdiz |
| 8,087,082 B2 | 12/2011 | Bloch et al. |
| 8,089,398 B2 | 1/2012 | Alizadeh-Shabdiz |
| 8,089,399 B2 | 1/2012 | Alizadeh-Shabdiz |
| 8,090,386 B2 | 1/2012 | Alizadeh-Shabdiz |
| 8,108,555 B2 | 1/2012 | Awadallah et al. |
| 8,121,617 B1 | 2/2012 | LaGrotta et al. |
| 8,126,456 B2 | 2/2012 | Lotter et al. |
| 8,127,358 B1 | 2/2012 | Lee |
| 8,135,395 B2 | 3/2012 | Cassett et al. |
| 8,195,196 B2 | 6/2012 | Haran et al. |
| 8,259,568 B2 | 9/2012 | Laudermilch et al. |
| 8,261,351 B1 | 9/2012 | Thornewell et al. |
| 8,266,288 B2 | 9/2012 | Banerjee et al. |
| 8,266,324 B2 | 9/2012 | Baratakke et al. |
| 8,346,860 B2 | 1/2013 | Berg et al. |
| 8,356,080 B2 | 1/2013 | Luna et al. |
| 8,364,785 B2 | 1/2013 | Plamondon |
| 2001/0044339 A1 | 11/2001 | Cordero et al. |
| 2002/0042886 A1 | 4/2002 | Lahti et al. |
| 2002/0087483 A1 | 7/2002 | Harif |
| 2002/0108058 A1 | 8/2002 | Iwamura |
| 2002/0183060 A1 | 12/2002 | Ko et al. |
| 2002/0191018 A1 | 12/2002 | Broussard |
| 2003/0028803 A1 | 2/2003 | Bunker et al. |
| 2003/0046134 A1 | 3/2003 | Frolick et al. |
| 2003/0079145 A1 | 4/2003 | Kouznetsov et al. |
| 2003/0115485 A1 | 6/2003 | Milliken et al. |
| 2003/0120951 A1 | 6/2003 | Gartside et al. |
| 2003/0131148 A1 | 7/2003 | Kelley et al. |
| 2004/0022258 A1 | 2/2004 | Tsukada et al. |
| 2004/0025042 A1 | 2/2004 | Kouznetsov et al. |
| 2004/0133624 A1 | 7/2004 | Park |
| 2004/0158741 A1 | 8/2004 | Schneider |
| 2004/0185900 A1 | 9/2004 | McElveen |
| 2004/0209608 A1 | 10/2004 | Kouznetsov et al. |
| 2004/0225887 A1 | 11/2004 | O'Neil et al. |
| 2004/0259532 A1 | 12/2004 | Isomaki et al. |
| 2005/0010821 A1 | 1/2005 | Cooper et al. |
| 2005/0015443 A1 | 1/2005 | Levine et al. |
| 2005/0074106 A1 | 4/2005 | Orlamunder et al. |
| 2005/0076246 A1 | 4/2005 | Singhal |
| 2005/0091308 A1 | 4/2005 | Bookman et al. |
| 2005/0125779 A1 | 6/2005 | Kelley et al. |
| 2005/0130627 A1 | 6/2005 | Calmels et al. |
| 2005/0138395 A1 | 6/2005 | Benco et al. |
| 2005/0138413 A1 | 6/2005 | Lippmann et al. |
| 2005/0138450 A1 | 6/2005 | Hsieh |
| 2005/0154796 A1 | 7/2005 | Forsyth |
| 2005/0186954 A1 | 8/2005 | Kenney |
| 2005/0197099 A1 | 9/2005 | Nehushtan |
| 2005/0221800 A1 | 10/2005 | Jackson et al. |
| 2005/0227669 A1 | 10/2005 | Haparnas |
| 2005/0237970 A1 | 10/2005 | Inoue |
| 2005/0254654 A1 | 11/2005 | Rockwell et al. |
| 2005/0278777 A1 | 12/2005 | Loza |
| 2005/0282533 A1* | 12/2005 | Draluk et al. ................. 455/418 |
| 2006/0026283 A1 | 2/2006 | Trueba |
| 2006/0073820 A1* | 4/2006 | Craswell et al. ............... 455/419 |
| 2006/0075388 A1 | 4/2006 | Kelley et al. |
| 2006/0080680 A1 | 4/2006 | Anwar et al. |
| 2006/0095454 A1 | 5/2006 | Shankar et al. |
| 2006/0101518 A1 | 5/2006 | Schumaker et al. |
| 2006/0130145 A1 | 6/2006 | Choi et al. |
| 2006/0150238 A1 | 7/2006 | D'Agostino |
| 2006/0150256 A1 | 7/2006 | Fanton et al. |
| 2006/0179485 A1 | 8/2006 | Longsine et al. |
| 2006/0217115 A1 | 9/2006 | Cassett et al. |
| 2006/0218482 A1 | 9/2006 | Ralston et al. |
| 2006/0224742 A1 | 10/2006 | Shahbazi |
| 2006/0236325 A1 | 10/2006 | Rao et al. |
| 2006/0253205 A1 | 11/2006 | Gardiner |
| 2006/0253584 A1 | 11/2006 | Dixon et al. |
| 2006/0272011 A1 | 11/2006 | Ide et al. |
| 2006/0277408 A1 | 12/2006 | Bhat et al. |
| 2006/0294582 A1 | 12/2006 | Linsley-Hood et al. |
| 2007/0005327 A1 | 1/2007 | Ferris |
| 2007/0011319 A1 | 1/2007 | Mcclure et al. |
| 2007/0015519 A1 | 1/2007 | Casey |
| 2007/0016953 A1 | 1/2007 | Morris et al. |
| 2007/0016955 A1 | 1/2007 | Goldberg et al. |
| 2007/0021112 A1 | 1/2007 | Byrne et al. |
| 2007/0028095 A1 | 2/2007 | Allen et al. |
| 2007/0028303 A1 | 2/2007 | Brennan |
| 2007/0028304 A1 | 2/2007 | Brennan |
| 2007/0038677 A1 | 2/2007 | Reasor et al. |
| 2007/0050471 A1 | 3/2007 | Patel et al. |
| 2007/0086476 A1 | 4/2007 | Iglesias et al. |
| 2007/0089165 A1 | 4/2007 | Wei et al. |
| 2007/0154014 A1 | 7/2007 | Aissi et al. |
| 2007/0174472 A1 | 7/2007 | Kulakowski |
| 2007/0186282 A1 | 8/2007 | Jenkins |

| | | |
|---|---|---|
| 2007/0190995 A1 | 8/2007 | Wang et al. |
| 2007/0214504 A1 | 9/2007 | Milani Comparetti et al. |
| 2007/0220608 A1 | 9/2007 | Lahti et al. |
| 2007/0240127 A1 | 10/2007 | Roques et al. |
| 2007/0240218 A1 | 10/2007 | Tuvell et al. |
| 2007/0240221 A1 | 10/2007 | Tuvell et al. |
| 2007/0240222 A1 | 10/2007 | Tuvell et al. |
| 2007/0248047 A1 | 10/2007 | Shorty et al. |
| 2007/0250627 A1 | 10/2007 | May et al. |
| 2007/0293263 A1 | 12/2007 | Eslambolchi et al. |
| 2007/0297610 A1 | 12/2007 | Chen et al. |
| 2008/0028470 A1 | 1/2008 | Remington et al. |
| 2008/0046369 A1 | 2/2008 | Wood |
| 2008/0046557 A1 | 2/2008 | Cheng |
| 2008/0047007 A1 | 2/2008 | Satkunanathan et al. |
| 2008/0049653 A1 | 2/2008 | Demirhan et al. |
| 2008/0065507 A1 | 3/2008 | Morrison et al. |
| 2008/0070495 A1 | 3/2008 | Stricklen et al. |
| 2008/0072329 A1 | 3/2008 | Herschaft |
| 2008/0086773 A1 | 4/2008 | Tuvell et al. |
| 2008/0086776 A1 | 4/2008 | Tuvell et al. |
| 2008/0109871 A1 | 5/2008 | Jacobs |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0148381 A1 | 6/2008 | Aaron |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0196104 A1 | 8/2008 | Tuvell et al. |
| 2008/0200160 A1 | 8/2008 | Fitzpatrick et al. |
| 2008/0208950 A1 | 8/2008 | Kim et al. |
| 2008/0209557 A1 | 8/2008 | Herley et al. |
| 2008/0235801 A1 | 9/2008 | Soderberg et al. |
| 2008/0276111 A1 | 11/2008 | Jacoby et al. |
| 2008/0293396 A1* | 11/2008 | Barnes et al. ............... 455/418 |
| 2008/0307243 A1 | 12/2008 | Lee |
| 2008/0318562 A1 | 12/2008 | Featherstone et al. |
| 2009/0172227 A1 | 7/2009 | Taylor et al. |
| 2009/0199298 A1 | 8/2009 | Miliefsky |
| 2009/0205016 A1 | 8/2009 | Milas |
| 2009/0205047 A1 | 8/2009 | Podjarny |
| 2009/0248623 A1 | 10/2009 | Adelman et al. |
| 2009/0293125 A1 | 11/2009 | Szor |
| 2010/0019731 A1 | 1/2010 | Connolly et al. |
| 2010/0064341 A1 | 3/2010 | Aldera |
| 2010/0097494 A1 | 4/2010 | Gum et al. |
| 2010/0100939 A1 | 4/2010 | Mahaffey et al. |
| 2010/0100963 A1 | 4/2010 | Mahaffey |
| 2010/0154032 A1 | 6/2010 | Ollmann |
| 2010/0210240 A1 | 8/2010 | Mahaffey et al. |
| 2010/0240419 A1 | 9/2010 | Horino |
| 2010/0313270 A1 | 12/2010 | Kim et al. |
| 2010/0332593 A1 | 12/2010 | Barash et al. |
| 2011/0119765 A1 | 5/2011 | Hering et al. |
| 2011/0171923 A1 | 7/2011 | Daly et al. |
| 2011/0296510 A1 | 12/2011 | Hatlelid et al. |
| 2012/0072569 A1 | 3/2012 | Xu |
| 2012/0124239 A1 | 5/2012 | Shribman et al. |
| 2012/0179801 A1 | 7/2012 | Luna et al. |
| 2012/0179814 A1 | 7/2012 | Swildens et al. |
| 2012/0188064 A1 | 7/2012 | Mahaffey et al. |
| 2012/0196571 A1 | 8/2012 | Grkov et al. |
| 2012/0259954 A1 | 10/2012 | McCarthy et al. |
| 2012/0303735 A1 | 11/2012 | Raciborski et al. |
| 2012/0317233 A1 | 12/2012 | Redpath |
| 2012/0324076 A1 | 12/2012 | Zerr et al. |
| 2013/0019311 A1 | 1/2013 | Swildens et al. |
| 2013/0023209 A1 | 1/2013 | Fisher et al. |
| 2013/0041974 A1 | 2/2013 | Luna et al. |

FOREIGN PATENT DOCUMENTS

| | | |
|---|---|---|
| WO | WO2005101789 | 10/2005 |
| WO | 2006110181 | 10/2006 |
| WO | 2008007111 | 1/2008 |
| WO | 2008057737 | 5/2008 |

OTHER PUBLICATIONS

"Real world Computing", 16$^{TH}$ Jun. 2008 (PC Pro), pp. 1-2.
"PhoneBak PDA Phone Anti-theft software for your PDA phone", 2007, Bak2u Pte Ltd (Singapore), pp. 1-3.
"PhoneBak: Mobile Phone Theft Recovery Software", 2007, Westin Tech.
U.S. Appl. No. 12/255,635.
U.S. Appl. No. 12/255,632.
McAfee, Internet Archive, Way Back Machine, available at <http://web.archive.org/web/20080517102505/www.mcafeesecure.com/us/technology-intro.jsp>, retrieved Feb. 23, 2011, 2 pages.
Qualys, "Executive Dashbard," Internet Archive, Way Back Machine, available at <http://web.archive.org/web/20080507161417/ www.qualys.com/products/screens/?screen=Executive+Dashboard>, retrieved Feb. 23, 2011, 1 page.
Qualys, "Vulnerability Management," Internet Archive, Way Back Machine, available at <http://web.archive.org/web/20080611095201/www.qualys.com/solutions/vulnerability_management> retrieved Feb. 24, 2011, 1 page.
Teh, Joe, "Norton 360 Version 3.0 Review," Mar. 9, 2009, available at http://techielobang.com/blog/2009/03/09/norton-360-version-30-review/> retrieved Feb. 23, 2011, 12 pages.
Windows Update, Internet Archive, Way Back Machine, available at <http://web.archive.org/web/20071022193017/http://en.wikipedia.org/wiki/Windows_Update> retrieved Feb. 23, 2011, 3 pages.
Wikipedia Java Virtual Machine.
Wikipedia Firefox Browser.
Dashwire: Manage Your Cell Phone on the Web, News Blog, Jessica Dolcourt, Oct. 29, 2007 5:00 AM PCT pp. 1-3.
MobileWipe web page, pp. 1-4.
"Real world Computing" 16th Jun. 2008 (PC Pro) pp. 1-2.
"PhoneBak PDA Phone Anti-theft software for your PDA phone", 2007 Bak2u Pte (Singapore), pp. 1-3.
"PhoneBak PDA: Mobile Phone Theft Recovery Software", 2007 Westin Tech.
"F-Secure Mobile Security for S60 User's Guide", pp. 1-34.
"Kaspersky Mobile Security", 1997-2007 Kaspersky Lab.
Berry Locator web page 2007.
Notification of Transmittal of the International Search Report and the Written Opinion of the International Searching Authority, of the Declaration for PCTUS2009/061370 mailed on Dec. 14, 2009.
U.S. Appl. No. 13/160,447.
U.S. Appl. No. 13/162,477.
U.S. Appl. No. 12/876,018.
U.S. Appl. No. 12/868,676.
U.S. Appl. No. 12/868,672.
U.S. Appl. No. 12/621,431.
U.S. Appl. No. 12/868,669.
U.S. Appl. No. 12/255,621.
TippingPoint Security Management System http://www.tippingpoint.com/products_sms.html.
Stay Secure by grafio http://widgets.opera.com/widget/4495/.
Symantec Endpoint Security, data sheet and product screen shot http://www.symantec.com/business/products/family.jsp?familyid=endpointsecurity.
Symantec Mobile Security Suite for Windows Mobile, data sheet and product screen shots http://www.symantec.com/business/products/sysreq.jsp?pcid=2241&pvid=mobile_security_suite_1.
Symantec Norton Smartphone security http://www.symantec.com/norton/smartphone-security.
Notification of Transmittal of the International Search Report and the Written Opinion of the International Searching Authority, of the Declaration for PCTUS2009/061372 mailed on Mar. 24, 2010.
U.S. Appl. No. 13/212,055.
U.S. Appl. No. 13/033,025.
U.S. Appl. No. 12/255,614.

U.S. Appl. No. 12/255,626.
U.S. Appl. No. 12/155,632.
U.S. Patent Appln. No. 112/255,635.
U.S. Appl. No. 11/397,521.
U.S. Appl. No. 13/284,248.
U.S. Appl. No. 13/313,937.
U.S. Appl. No. 13/314,032.
U.S. Appl. No. 13/333,654.
U.S. Appl. No. 13/335,779.
U.S. Appl. No. 13/410,979.
Diligenti, M., et al., Focused Crawling Using Context Graphs:, Proceedings of the 26th VLDB Conference, Cairo, Egypt, 2000, pp. 1-8.
PCT International Search Report and Written Opinion of the International Searching Authority for PCT/US2011/049182; Mailed on Dec. 23, 2011; pp. 1-11.
U.S. Appl. No. 13/160,382.
U.S. Appl. No. 12/372,719.
U.S. Appl. No. 13/267,731.
Virus Total, VT Community, www.virustotal.com/index.html; Dated Dec. 16, 2011; 44 Pages.
Sprite Mobile, Sprite Backup, Internet Archive, Way Back Machine, available at http://web.archive.org/web/20080901220103/http://www.spritesoftware.com/?page_id=280, 4 pages, Retrieved Jan. 16, 2013.
Sprint Nextel, Mobile Locator, Internet Archive, Way Back Machine, available at http://web.archive.org/web/20080901070835/http://www.nextel.com/en/solutions/gps/mobile_locator.shtml, 2 pages, Retrieved Jan. 16, 2013.
Richardson, Alexis, "Introduction to RabbitMQ," Google UK, available at http://www.rabbitmq.com/resources/google-tech-talk-final/alexis-google-rabbitmq-talk.pdf, retrieved on Mar. 30, 2012, 33 pages, published on Sep. 25, 2008.
Fisher, Oliver, "Malware? We Don't Need No Stinking Malware!," Google, available at http://googlewebmastercentral.blogspot.com/2008/10/malware-we-dont-need-no-stinking.html, retrieved on Mar. 30, 2012, published on Oct. 24, 2008, 11 pages.
Reardon, Marguerite, "Mobile Phones That Track Your Buddies," Cnet, available at http://news.cnet.com/Mobile-phones-that-track-your-buddies/2100-1039_3-6135209.html, retrieved on Mar. 30, 2012, published on Nov. 14, 2006, 4 pages.
Fette, Ian "Understanding Phishing and Malware Protection in Google Chrome," The Chromium Blog, available at http://blog.chromium.org/2008/11/understanding-phishing-and-malware.htm, retrieved on May 17, 2011, published on Nov. 14, 2008, 6 pages.
Kincaid, Jason, "Urban Airship Brings Easy Push Notifications To Android," TechCrunch, available at http://techcrunch.com/2010/08/10/urban-airship-brings-easy-push-notifications-to-android/, retrieved on Jun. 16, 2011, published Aug. 10, 2010, 5 pages.
Keane, Justin K. "Using the Google Safe Browsing API from PHP," Mad Irish, Aug. 7, 2009, available at http://www.madirish.net/node/245, retrieved on Mar. 30, 2012, published on Aug. 7, 2009, 5 pages.
Jefferies, Charles P. "Webroot AntiVirus 2010 With Spy Sweeper Review," Notebook Review, available at http://http://www.notebookreview.com/default.asp?newsID=5700&review=Webroot+AntiVirus+2010+With+Spy+Sweeper+Review, retrieved on May 18, 2011, published on Jun. 22, 2010, 3 pages.
"Kaspersky Mobile Security", Kaspersky Lab 2008, available at http://www.kaspersky.com/kaspersky_mobile_security, retrieved on Sep. 11, 2008, published on Apr. 30, 2008, 2 pages.
Summerson, Cameron, "5 Android Antivirus Apps Compared, Find Out Which Ones Are Worth Having!," Android Headlines, available at http://androidheadlines.com/2011/03/5-android-antivirus-apps-comapred-find-out-which-ones-are-worth-having.html, retrieved on Mar. 30, 2012, published on Mar. 8, 2011, 9 pages.
"Android Cloud to Device Messaging Framework," Google Code Labs, available at http://code.google.com/android/c2dm/, retrieved on Sep. 14, 2011, published on Apr. 11, 2011, 9 pages.
"BlackBerry Push Service Overview", available at http://us.blackberry.com/developers/platform/pushapi.jsp#tab_tab_resources, retrieved on Sep. 14, 2011, published on Nov. 6. 2010, 21 pages.
"eSoft unveils SiteFilter 3.0 for OEMs," Infosecurity, Mar. 23, 2010, available at http://www.infosecurity-magazine.com/view/8273/esoft-unveils-sitefilter-30-for-oems/, retrieved on Mar. 30, 2012, published on Mar. 23, 2010, 2 pages.
"Get the Physical Location of Wireless Router From its MAC Address (BSSID)," Coderrr, available at http://coderrr.wordpress.com/2008/09/10/get-the-physical-location-of-wireless-router-from-its-mac-address-bssid/, retrieved on Mar. 30, 2012, published on Sep. 12, 2008, 13 pages.
"Hooking—Wikipedia, the Free Encyclopedia," Wikipedia, available at http://en.wikipedia.org/wiki/Hooking, retrieved on Mar. 30, 2012, published on Apr. 15, 2010, 6 pages.
Mytton, David "How to Build an Apple Push Notification Provider Server (Tutorial)," Server Density, available at http://blog.serverdensity.com/2009/07/10/how-to-build-an-apple-push-notification-provider-server-tutorial/, retrieved on Apr. 2, 2012, published on Jul. 10, 2009, 33 pages.
"Pidgin The Universal Chat Client," Pidign, available at http://www.pidgin.im/, retrieved on Sep. 14, 2011, published on May 1, 2007, 14 pages.
Pogue, David "Simplifying the Lives of Web Users," The New York Times, available at http://www.nytimes.com/2010/08/19/technology/personaltech/19pogue.html, retrieved on May 17, 2011, published on Aug. 18, 2010, 5 pages.
"Twilio Cloud Communications Web Service API for Building Voice and SMS Applications," Twilio, available at http://www.twilio.com, retrieved Sep. 14, 2011, published on Jun. 5, 2008, 12 pages.
"Understanding Direct Push," Microsoft, available at http://technet.microsoft.com/en-us/library/aa997252(v=exchg.80).aspx, retrieved on Mar. 30, 2012, published on Feb. 18, 2009, 3 pages.
"Urban Airship: Powering Modern Mobile," available at http://urbanairship.com/products/, retrieved on Sep. 16, 2011, published on Feb. 19, 2010, 14 pages.
"zVeloDB URL Database," zVelo, available at https://zvelo.com/technology/zvelodb-url-database, retrieved on Mar. 30, 2012, published on Jan. 21, 2012, 2 pages.
Amazon.com: Mining the Web Discovering Knowledge from Hypertext Data (9781558607545): Soumen Chakrabarti: Books, Amazon, available at http://www.amazon.com/exec/obidos/ASIN/1558607544/, retrieved on Jun. 7, 2012, Published on Dec. 13, 2002, pp. 1-7.
Clickatell, available at http://www.clickatell.com, retrieved on Sep. 14, 2011, published on Jan. 18, 2011, 11 pages.
PagerDuty, available at http://www.pagerduty.com, retrieved on Sep. 14, 2011, published on Jun. 6, 2009, 23 pages.
Prey, available at http://preyproject.com/, retrieved on Jan. 10, 2012, published on May 16, 2009, 4 pages.
Simone, "Playing with ActiveMQ," Mostly Useless, available at http://www.mostly-useless.com/blog/2007/12/27/playing-with-activemq/, retrieved Mar. 30, 2012, published on Dec. 27, 2007, 6 pages.
Trillian, available at http://www.trillian.im/, retrieved on Sep. 14, 2011, published on Oct. 11, 2007, 24 pages.

* cited by examiner

SYSTEM AND METHOD FOR REMOTELY SECURING OR RECOVERING A MOBILE DEVICE

CROSS REFERENCE TO RELATED APPLICATIONS

The present application is related to the following co-pending U.S. patent applications: U.S. patent application Ser. No. 12/255,635, entitled "SECURITY STATUS AND INFORMATION DISPLAY SYSTEM" filed Oct. 21, 2008, U.S. application Ser. No. 12/255,632, "SECURE MOBILE PLATFORM SYSTEM" filed Oct. 21, 2008, U.S. application Ser. No. 12/255,626, "SYSTEM AND METHOD FOR A MOBILE CROSS-PLATFORM SOFTWARE SYSTEM" filed Oct. 21, 2008, U.S. patent application Ser. No. 12/255,621, "SYSTEM AND METHOD FOR ATTACK AND MALWARE PREVENTION" filed Oct. 21, 2008 and U.S. patent application Ser. No. 12/255,614, "SYSTEM AND METHOD FOR MONITORING AND ANALYZING MULTIPLE INTERFACES AND MULTIPLE PROTOCOLS" filed Oct. 21, 2008, which are all hereby incorporated by reference.

FIELD

The present invention relates generally to mobile communications devices and more specifically to systems and methods for enabling a user or administrator to remotely secure, control and manage a mobile device or group of mobile devices.

BACKGROUND

Mobile devices have evolved beyond simple telephone functionality and are now highly complex multifunctional devices with capabilities rivaling those of desktop or laptop computers. In addition to voice communications, many mobile devices are capable of text messaging, e-mail communications, internet access, and the ability to run full-featured application software. Mobile devices can use these capabilities to perform online transactions such as banking, stock trading, payments, and other financial activities. Furthermore, mobile devices used by an individual, a business, or a government agency often store confidential or private information in forms such as electronic documents, text messages, access codes, passwords, account numbers, e-mail addresses, personal communications, phone numbers, and financial information.

As the criticality of mobile devices grows, missing devices become an increasingly severe problem. Currently, when a mobile device is lost, a user may try to locate it by calling the device's phone number; however, unless it is within close proximity to the user, the device will not likely be found. If the mobile device is not found, the user must deactivate the account associated with the missing device and transfer it to a new device which is likely purchased at substantial cost to the user or organization. Any data present on the missing device will be lost unless it is backed up or stored somewhere outside of the device. Re-entering lost data such as contact information and device settings may entail hours of work. In addition, certain types of information being present on a mobile device may require a business or government agency to perform a damaging and costly public breach disclosure.

A malicious person who steals or finds a mobile device may use the device itself or the information stored on it for illegitimate purposes. A stolen device may be used to place phone calls, perform financial transactions, or subject its owner to financial loss in other ways. Furthermore, the confidential or private information on a device may be extracted by an unauthorized individual and used to the detriment of the device's owner. In many cases, the loss of government, business, or personal data is far more problematic than the replacement cost of the mobile device. In the case of government or certain business devices, preventing the data from a lost or stolen device from falling into malicious hands is of extreme importance to national security.

It is important for users and administrators to be able to remediate problems associated with lost or stolen devices as quickly and easily as possible. In organizations that utilize multiple types of mobile devices, each with separate management systems, dealing with a lost or stolen device may be a complex process. Furthermore, end users typically must contact and rely on an administrator in order to secure a missing device, often resulting in a period of several days between the time of loss and when remote security actions are finally initiated. Such a delay significantly increases the risk of financial or information loss associated with the missing device.

What is needed is a system that allows both users and administrators to obtain remote access to a lost or stolen mobile device in order to secure the stored data, locate the mobile device, and provide feedback that confirms that the desired actions have successfully been executed. For users the system must be able to secure, control, and manage one or more personal devices and for administrators the system must be able to secure, control and manage a plurality of devices of multiple device types in order to be effective in an organization that has a heterogeneous mobile device deployment.

DETAILED DESCRIPTION

Figure 1:
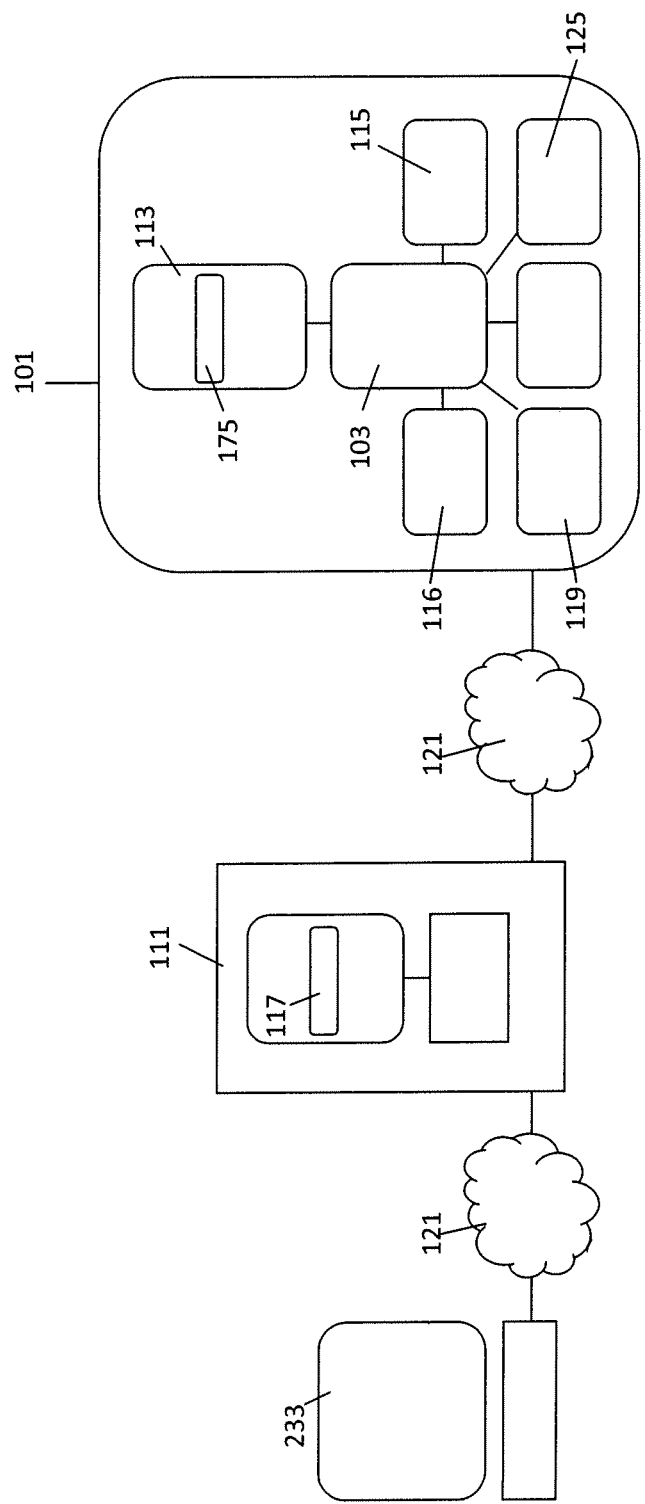
FIG. 1 illustrates a diagram of a mobile device, server and client computer.

It should be appreciated that the present invention can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. Applications may also be downloaded in whole or in part through the use of a software development kit, framework, or toolkit that enables the creation and implementation of the present invention. In this specification, these implementations, or any other form that the invention may take, may be referred to as techniques. In general, the order of the steps of disclosed processes may be altered within the scope of the invention.

As used herein, the term "mobile communications device" refers to mobile phones, PDAs and smartphones. The term "mobile communications device" also refers to a class of laptop computers which run an operating system that is also used on mobile phones, PDAs, or smartphones. Such laptop computers are often designed to operate with a continuous connection to a cellular network or to the internet via a wireless link. The term "mobile communications device" excludes other laptop computers, notebook computers, or sub-notebook computers that do not run an operating system that is also used on mobile phones, PDAs, and smartphones. Specifically, mobile communications devices include devices for which wireless communications services such as voice, messaging, data, or other wireless Internet capabilities are a primary function. As used herein, a "mobile communications device" may also be referred to as a "device," "mobile device," "mobile client," or "handset." However, a person having skill in the art will appreciate that while the present invention is disclosed herein as being used on mobile communications devices, the present invention may also be used on other computing platforms, including desktop, laptop, notebook, netbook or server computers.

As used herein, the term "client computer" refers to any computer, embedded device, mobile device, or other system that can be used to perform the functionality described as being performed by the client computer. Specifically, client computers include devices which can be used to display a user interface by which the functionality provided by the server can be utilized by a user. Client computers may be able to display a web page, load an application, load a widget, or perform other display functionality that allows the client computer to report information from the server to the user and to receive input from the user in order to send requests to the server.

A. System Architecture

With reference to FIG. 1, a block diagram of an embodiment of the mobile device 101 is illustrated. The mobile device 101 includes: an operating system 113, an input device 115, a radio frequency transceiver(s) 116, a visual display 125, and a battery or power supply 119. Each of these components is coupled to a central processing unit (CPU) 103. The device operating system 113 runs on the CPU 103 and enables interaction between security system application programs and the mobile device hardware components.

In an embodiment, the mobile device 101 receives data through an RF transceiver(s) 116 which may be able to communicate via various networks, for example: Bluetooth, local area networks such as WiFi, and cellular networks such as GSM or CDMA.

In an embodiment, a local software component 175 is an application program that is downloaded to a mobile device and installed so that it integrates with the operating system 113. Much of the source code for the local software component 175 can be re-used between various mobile device platforms by using a cross-platform software architecture. In such a system, the majority of software functionality can be implemented in a cross-platform core module. The cross-platform core can be universal allowing it to interface with various mobile device operating systems by using a platform-specific module and a platform abstraction module that both interact with the mobile device operating system 113, which is described in U.S. patent application Ser. No. 12/255,626, entitled "SYSTEM AND METHOD FOR A MOBILE CROSS-PLATFORM SOFTWARE SYSTEM." In another embodiment, the local software component 175 can be device, platform or operating system specific.

The mobile device 101 accesses a communications network 121 which permits access to a server 111. The server 111 may also be accessed by a client computer 233 via network 121. The network 121 will normally be the Internet but can also be any other communications network. Alternatively, the mobile device 101 may access the server 111 by a different network than the network the client computer 233 accesses the server 111 with. In an embodiment, the server 111 is provided with server software 117. The server software 117 on the server 111 provides functionality to allow two-way communication between the server 111 and the mobile device 101, as well as two-way communication between the server 111 and the client computer 233 also through the network 121. The server software 117 on the server 111 enables the client computer 233 to access the mobile device 101 and issue commands from the client computer 233 to the mobile device 101. The server software 117 also allows for the mobile device 101 to communicate with the client computer 233 to deliver status information about the mobile device 101 after the commands from the client computer 233 have been executed or while they are in progress. Furthermore, the server software 117 allows data, such as location-related information, pictures, contacts, videos, SMS messages, call history, event logs, and settings to be transferred from the mobile device 101 to the client computer 233 and from the client computer 233 to the mobile device 101. In an embodiment, the server software 117 generates a web page for display on the client computer 233 which allows an authorized user to use remote access and configuration controls relating to the mobile device 101. In an embodiment, the server also includes a database 179 that is used to store backed-up data and other information from the mobile device 101.

Of course, it is understood by those of ordinary skill in the art that the functionality performed by server 111 does not necessarily have to be accomplished on a single hardware device. In this context, the use of the term server is intended to refer to one or more computers operating in cooperation or collaboration to provide the functionality described herein. The computers may be co-located or in different locations.

The computers may inter-operate in such a way that portions of functionality are provided by separate services that may or may not be operated by the same entity as other computers which provide other functionality. For example, one set of servers may provide data storage functionality while another provides all other functionality. The data storage servers may be operated by a separate company than the servers that provide the other functionality. S3 (simple storage system), from Amazon, Inc. is such a data storage service which may be utilized by separate set of computers to enable the present invention.

With regard to the client computer 233, in the preferred embodiment, the client computer accesses the server software 117 on the server 111, and does not require that the client computer 233 to possess computer program instruction sets for the server software 117 locally. However, in certain embodiments, the client computer 233 can be programmed with software that allows it to remotely control or access a mobile device.

In an embodiment, an application or widget loaded on the client computer is used to present a user interface to the user. The user interface may provide some or all of the functionality provided by the web page displayed on the client computer. The application or widget contains presentation logic and communicates with the server via an API. The application or widget sends a request to the server in order to retrieve information from the server for display. The server returns the information in a structured format such as XML or JSON, so that the application or widget is able to display the information in an arbitrary manner. For example, the information requested by the application or widget and returned by the server may contain data such as: a list of devices accessible by the user, status information relating to a device, or a list of devices in a group managed by the user that are determined to be lost or stolen. The application or widget may also send a request to the server to perform actions on a device, change settings relating to a device, or access any other functionality provided by the server. For example, a widget may show the device and its phone number based in information retrieved from the server. The widget may have a button which allows the user to request for the server to instruct the device to play a sound. After the server has instructed the device to play a sound and the device has responded that it has started performing the action, the widget may request for the server to return the status of the command. After receiving the response from the server, the widget displays that the sound is currently playing on the device.

Figure 2:
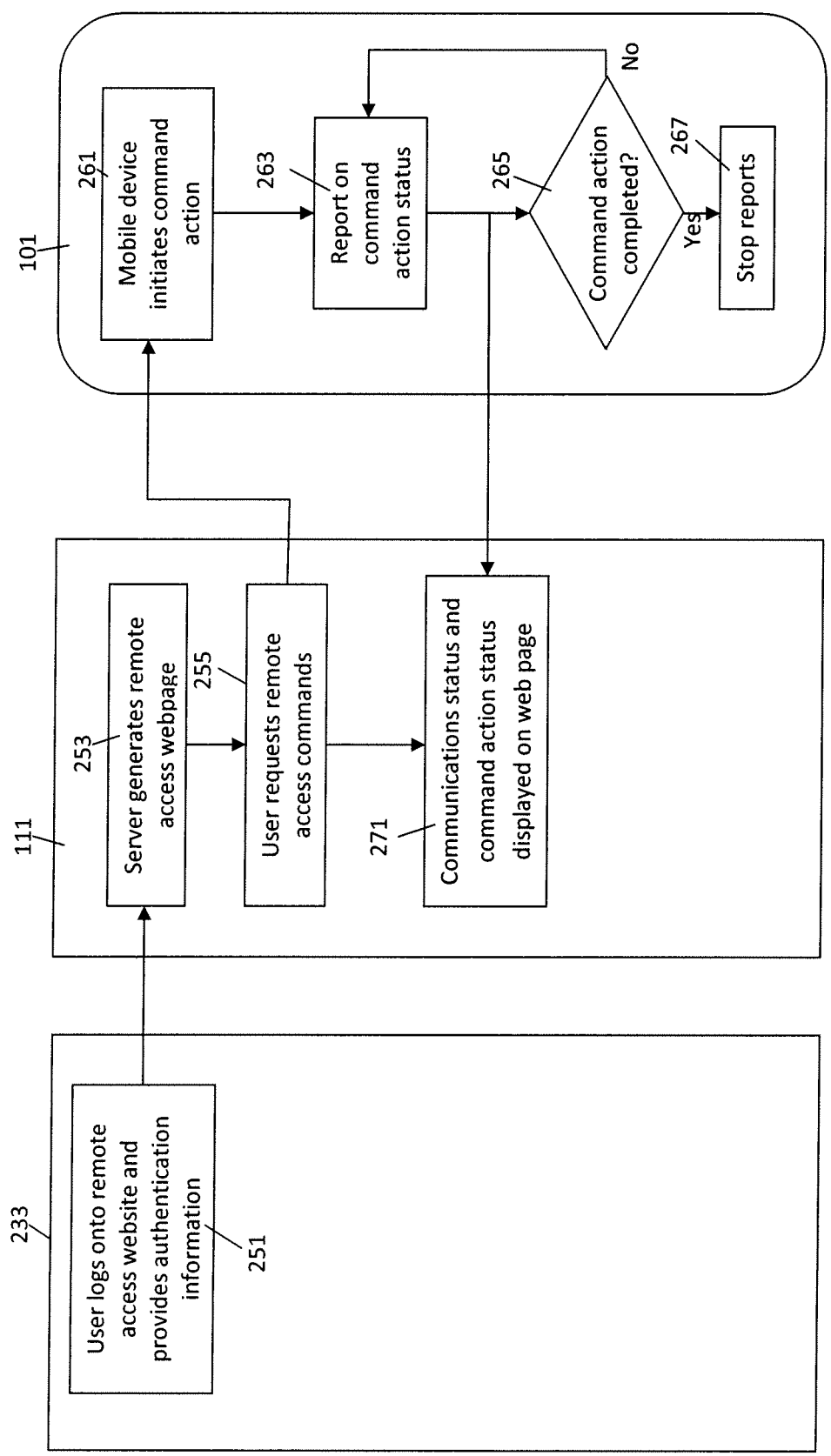
FIG. 2 illustrates a flow chart of the remote access processing performed on the mobile device.

The steps for remote access to the mobile device 101 are shown in FIG. 2. If the mobile device 101 is lost or stolen, the user can use the client computer 233 to access the server software 117 running on the server 111 to remotely access the mobile device 101. Preferably, the server 111 will only allow the user to perform tasks after he or she has supplied authorized credentials 251. The server 111 may require authentication information such as a user name, password, biometric data, or other security-related information. If the user is authorized, the server 111 retrieves previously stored information about the mobile device 101 for which remote access is sought. The server 111 then generates a remote access web page corresponding to the mobile device 101 that is accessible by the client computer 233 and includes a user interface 253 which provides remote access to the mobile device 101. Some of the remote access controls include locating the mobile device 101 by providing the location of the mobile device 101 on a map, making the mobile device 101 play a sound, backing up the data on the mobile device 101, locking or unlocking the mobile device 101, monitoring audio or video near from the mobile device 101, monitoring any actions taken on the mobile device 101, and wiping any memory in the mobile device 101.

The client computer 233 can request one or more actions to be performed by the mobile device 255, causing the server 111 to transmit the command(s) to the mobile device to perform the selected action(s) 261. In some cases, the mobile device 101 cannot receive commands because it is outside of a communications network coverage area, its batteries are dead, or for various other reasons. In an embodiment, the server 111 can display the communications status, including attempted communications with the mobile device, on the remote access web page 271. If the mobile device is not able to receive or process the command(s), the remote access web page can indicate that communication with the device is being attempted. The server will continue to attempt to send a given command to the mobile device until the mobile device successfully completes the command, the command is manually cancelled, or the command cancelled through some setting established by the server software 117. Once the server 111 receives acknowledgement from the client that it received the command successfully, the remote access web page will indicate that the action corresponding to the command is in progress.

Any web pages generated by the server software 117 may be updated to show changes without action by the user by using technology such as JavaScript or Adobe Flash which can connect to the server 111 and retrieve updated information even after a web page is generated. The requests from client computer 233 to the server 111 may be periodic, occurring on an interval, or have long timeouts in order to allow the server 111 to respond only when changes have occurred or a timeout has been reached.

It is understood by one with ordinary skill in the art that the functionality or information provided by a web page does not necessarily have to be accomplished by a single document generated by the server 111. For example, a document may be an HTML document. In this context, the use of the term web page is intended to mean one or more documents that provide the functionality described herein. The functionality may be split between multiple documents and grouped by likely use cases. A single document may have the ability to change the functionality it presents to the user using a technology such as JavaScript which can modify the presentation of and, therefore, the functionality enabled by a document.

When the mobile device 101 receives the command(s) from the server 111, the local software component 175 on the mobile device 101 initiates the commanded action(s) 261. The local software component 175 then monitors the commanded action and prepares reports on the action's status 263. The mobile device 101 continues to check if the commanded action has been completed 265 and, if desired, transmits updated command status 263 back to the server 111. The command status is interpreted and updated information may be displayed on the web page 271. In an embodiment, the reports are only prepared when the commanded action has completed successfully or has failed, but not while it is in progress.

In an embodiment, the status report indicates the progress of the mobile device's execution of a commanded action. For example, the first status report can indicate that the mobile device is beginning to perform the commanded action. Subsequent reports would then indicate the partial completion of the commanded action. The web page 253 accessed by the client computer 233 can graphically display the progress of the command and may also provide an estimated completion time. When the mobile device has determined that the commanded action has been completed 265, the local software component 175 will send confirmation of the commanded action's completion and stop preparing reports 267.

If the user requests more than one command, the server 111 can transmit multiple commands to the mobile device 101 together. The mobile device 101 may then perform the commanded actions simultaneously and the next communication with the server 111 can provide the status of all the commanded actions. Alternatively, the sever 111 may store the command action requests and transmit each of the commands sequentially. The server 111 will transmit each command to the mobile device after the prior command has been completed. In an embodiment, the server 111 transmits all commands to the mobile device 101 together. The device 101 processes them in order of transmission, waiting for a given command to be completed before moving on to the next. The sequence and conditions for performing the commands can be configured in any manner.

Figure 3:
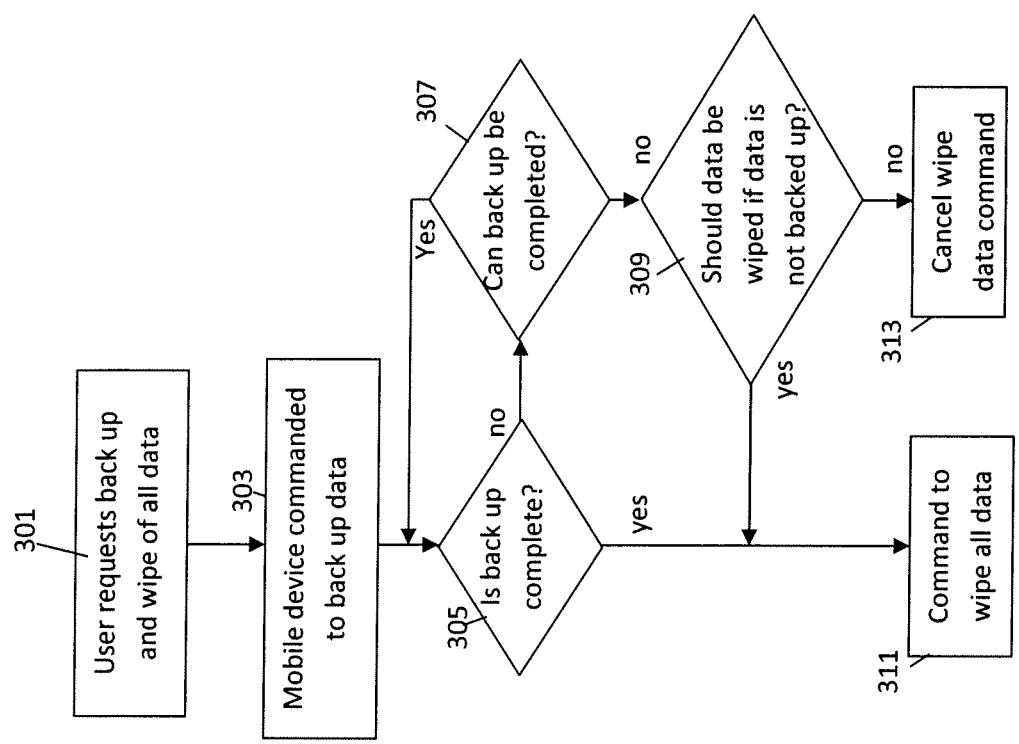
FIG. 3 illustrates a flow chart for conditional commands performed on the mobile device.

In some cases, a failure to complete a command will cause the system to stop subsequent commands. For example with reference to FIG. 3, a user who has lost a mobile device will first want to backup the data stored on the mobile device memory and then wipe all data from the memory after the backup is performed. The user can use the remote access web page to request a backup and secure wipe of all data on the mobile device 301. The server commands the mobile device to back up all stored data 303. The system will monitor the progress of the backup command 305. If the backup is successful, the mobile device memory will be wiped 311. However, if the backup fails, the system analyzes the command status to determine if the backup can be completed 307. If the backup can be completed, the system will continue to monitor the backup progress 305. If the backup cannot be completed, the system can transmit a request to the remote access web page asking the user if the data should be wiped if the backup cannot be completed 309. The system processing can be performed by either the remote device or the server. The user can then choose to cancel the wipe command 313. If a recent backup does not exist, the user may want to make further attempts to find the mobile device before erasing the memory. Alternatively, the user can confirm the wipe command and the server will command the mobile device to wipe all data from the mobile device 311. This may be an appropriate choice if the mobile device data was backed up recently and very little data would be lost. In an embodiment, the server automatically chooses whether or not to perform the wipe depending on factors including the last backup time or pre-chosen settings. In an embodiment, the mobile device automatically chooses whether or not to perform the wipe. While one specific example of conditional command processing has been described, various other commands can be processed in a similar manner.

B. Communications

With reference to FIG. 1, specific communication protocols are used between the server 111 and the local software component 175 on the mobile device 101 to facilitate secure communications. In a preferred embodiment, commands can be sent both from the server 111 to the client 101 and from the client 101 to the server 111. The connection uses a standardized transport protocol such as HTTP to transmit data in both directions. The connection may use a security layer such as TLS (Transport Layer Security) or SSL (Secure Sockets Layer). Because HTTP is composed of request and response pairs, in order to support a persistent connection, multiple request and response pairs are strung together. A protocol such as SyncML is used on top of the HTTP layer to structure the information exchanged between the mobile device 101 and the server 111 and manage the logical session that is composed of the individual HTTP request and response pairs. More information about SyncML can be found at http://www.openmobilealliance.org. The mobile device 101 will initiate a connection whenever it has commands to send to the server 111 or when the server 111 indicates that it has commands to send to the device 101. The device 101 continues sending HTTP requests to which the server 111 responds while either the mobile device 101 or server 111 have outstanding commands.

Figure 4:
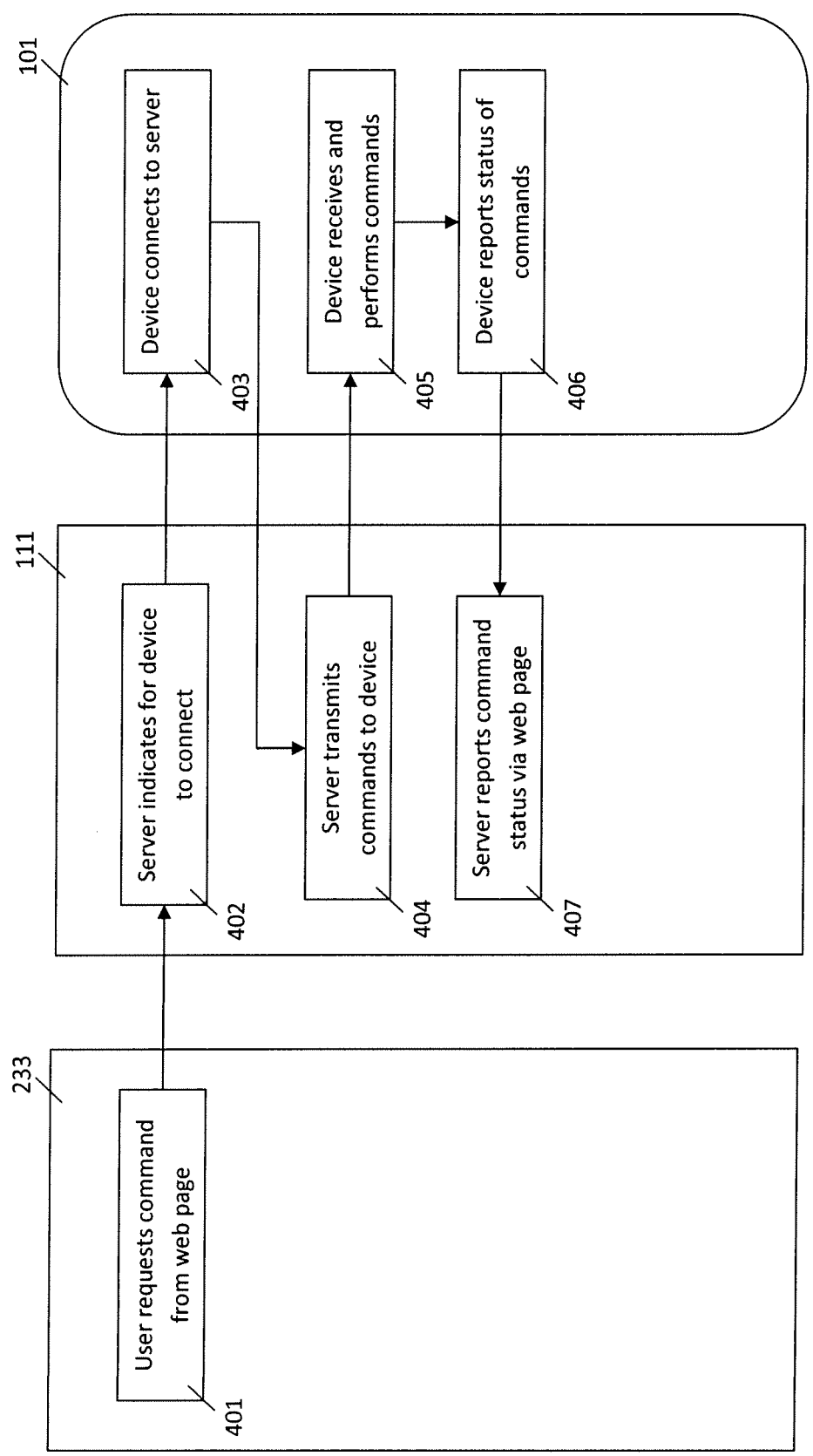
FIG. 4 illustrates a flow chart for communicating with the mobile device.

With reference to FIG. 4, when the client computer 233 requests a command for the mobile device 101 from a web page generated by the server 111, the client computer transmits the request to the server 401 and the server transmits an indication message to the device 402. The indication message instructs the mobile device 101 to connect to the server 111. The mobile device 101 responds by connecting to the server 403. The server then transmits the commands to the mobile device 404. The device receives the commands and the local software component 175 interacts with the operating system 113 to perform the requested commands 405. In an embodiment, the local software component 175 also monitors the progress of the requested commands and transmits command progress reports back to the server 111 that indicate the status of the commands 406. The server interprets the reports and displays the command status on the web page viewed by the client computer 407.

In an embodiment, one or more commands can be transmitted from the server 111 to the mobile device 101 in a secure short message service (SMS) protocol. The local software component 175 interprets SMS packets and verifies that they came from an authorized source. In an embodiment, the protocol uses digital signatures to authoritatively identify the source of an SMS packet, sometimes called a protocol data unit (PDU). In an embodiment, the protocol uses an encryption scheme such as public key encryption to prevent the contents of PDUs from being seen by unauthorized parties. If a PDU is found to be from a trusted source, the mobile device 101 performs any requested commands present in the PDU. The local software component 175 monitors the command progress and transmits the status reports to the server 111 using the secure SMS protocol. Alternatively, the local software component 175 may report the status back to the server using an HTTP based protocol, such as has been described above. In order to overcome the limitations of SMS PDU length, multiple SMS PDUs may be reassembled to transmit large commands.

Of course, it is understood to one of ordinary skill in the art that the device 101 and the server 111 may be configured to communicate in ways other than those directly described in this disclosure to perform the functionality of the inventive system. Such additional manners of communication include using different transport protocols (e.g. TCP instead of HTTP), using different structured data formats (e.g. JSON instead of XML), using different indication mechanisms (e.g. XMPP instead of SMS), and other changes that do not meaningfully alter the functionality or functions provided by the present invention.

1. Indication

Figure 6:
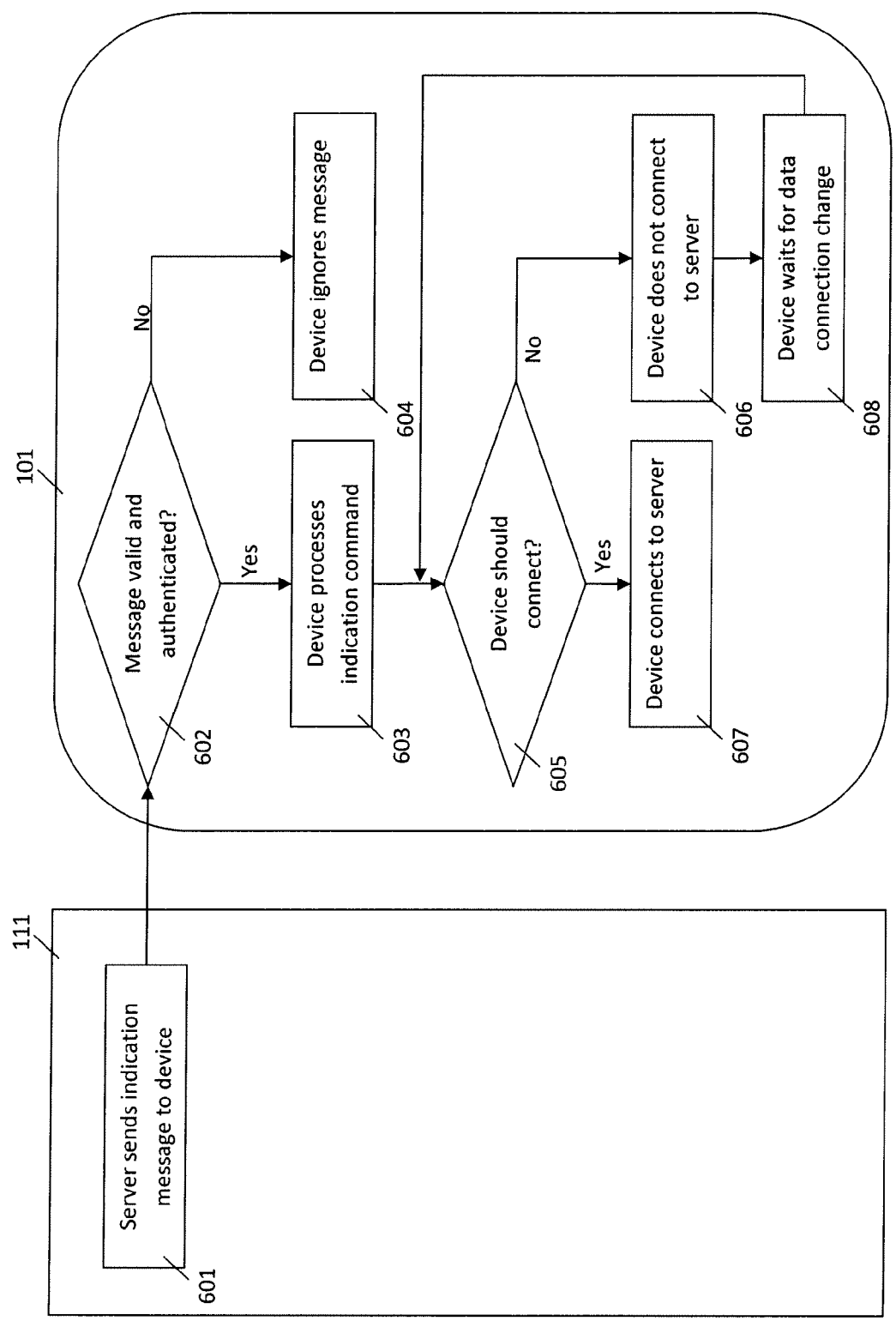
FIG. 6 illustrates a flow chart for indicating to the mobile device via a messaging service that the server has remote access commands for the device.

In an embodiment with reference to FIG. 6, the server 111 indicates to the mobile device 101 that there are one or more commands waiting to be sent from the server 111 to the device 101 by utilizing a push messaging service such as SMS. When the server wishes for the mobile device to connect, it sends an SMS message to the device's phone number with an indication command and an authentication token that is known only to the server and mobile device 601. The mobile device receives the SMS message and checks to see if it matches a pre-defined indication command format and checks for the presence and validity of the authentication token 602. If the command is valid and the token matches, the device will execute the indication command 603. If the message does not match the indication command format, the command is not valid, or the authentication token does not match, the message is ignored 604. In an embodiment, the indication command contains a priority code which tells the mobile device 101 how important any commands waiting to be sent on the server 111 are. The device decides whether or not to connect to the server depending on the priority reported by the server and cost of data transfers for its current connection 605. If the mobile device is out of its home coverage area and network data transfers are expensive, the device does not connect to receive low priority commands 606; however, if the server has a high priority command, such as one corresponding to a wipe request, the device will connect to the server through any means necessary without regard to cost 607. While one example of conditional connection has been described, the invention can be configured to connect based on various other criteria. In an embodiment, if the device does not connect to the server, it will wait until its data connection changes 608, and then decide if it should connect again 605. In an embodiment, the indication command contains a message identifier which is used to correlate SMS messages sent by the server 111 with SMS messages received by the device 101. The message identifier is reported to the server when a command exchange session using a protocol such as SyncML is started as a result of an indication message. The correlation allows the server 111 to identify non-reception of SMS messages by the device 101. Non-reception may be indicative of a network or phone configuration problem. By identifying such problems automatically, the problems can be corrected before the lack of SMS reception prevents indication messages from being received by the device 101 in the case of a missing device.

Figure 7:
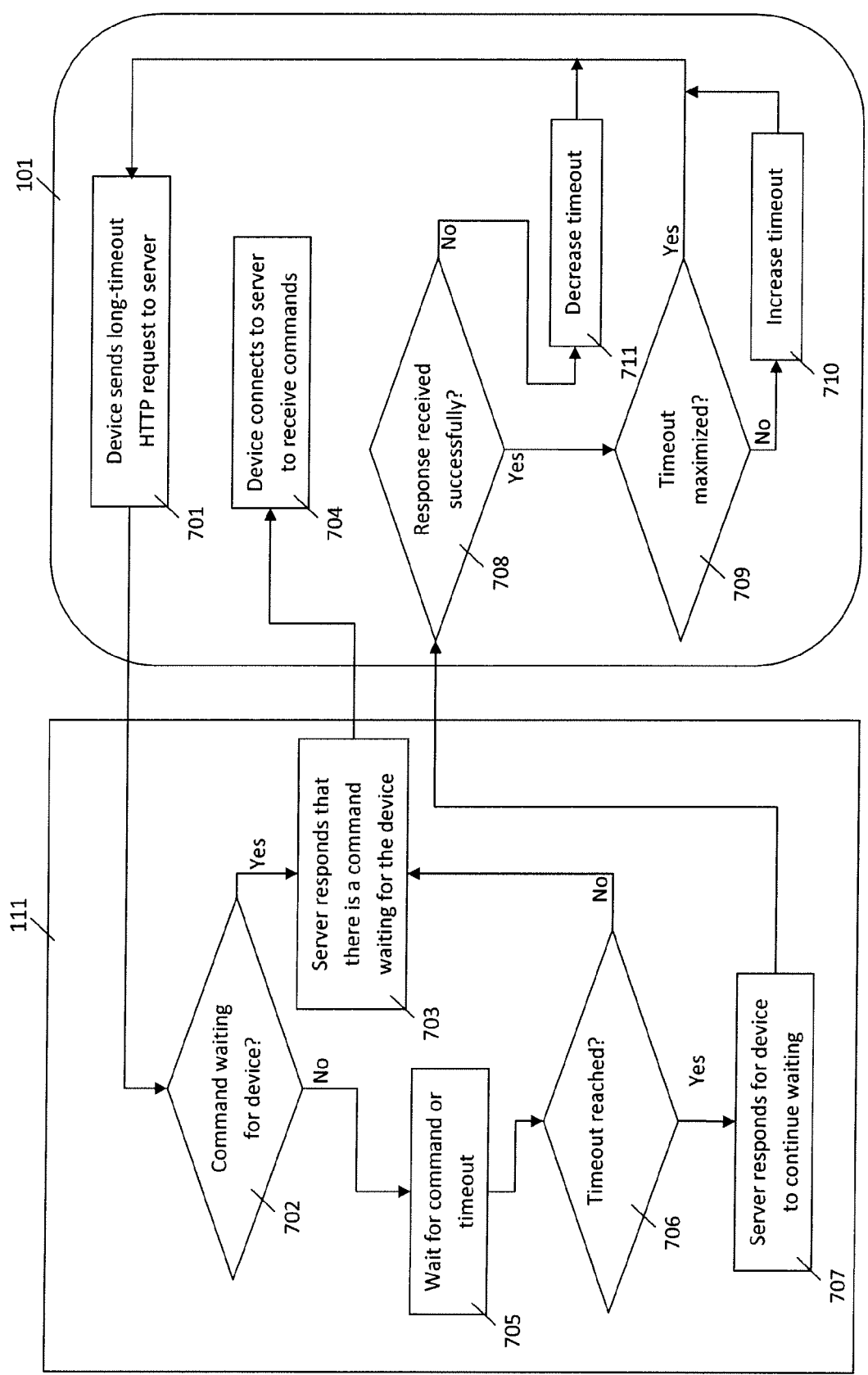
FIG. 7 illustrates a flow chart for indicating to the mobile device via a long-timeout HTTP connection that the server has remote access commands for the device.

In an embodiment with reference to FIG. 7, the server 111 indicates to the mobile device 101 that there are one or more commands waiting to be sent from the server 111 to the device 101 by utilizing a long-timeout HTTP connection. The mobile device 101 transmits an HTTP request to the server 701. The request contains the response timeout, the maximum time the server may wait before returning a response. The request also contains authentication information that identifies the device to the server. The response timeout can typically range from 1 to 60 minutes. The server checks to see if there are any commands waiting on the server to be retrieved by the device 702. If there is at least one command waiting for the device, the server transmits an HTTP response to the device indicating that there is a command waiting to be retrieved 703. When the device receives this message, it connects to the server to retrieve any waiting commands 704. If there are no commands waiting to be retrieved by the device, rather than responding immediately, the server waits for a command to become ready to be retrieved by the device for up to the maximum timeout specified in the request 705. When the timeout has been reached or there is a command on the server waiting to be retrieved by the device, the server decides what type of response to return to the device 706. If there is a command waiting to be retrieved by the device, the server will respond to the outstanding HTTP request before the maximum response timeout is reached, telling the device to connect to the server 703. If the maximum response timeout is reached without the server having a command ready to be retrieved by the device, the server responds and instructs the mobile device to continue waiting with another long-timeout HTTP request 707. The mobile device will then transmit a new long-timeout HTTP request to the server 701. Because an HTTP request is always outstanding, a secure persistent connection exists between the server 111 and the mobile device 101. In order to minimize the impact on the mobile device's battery life and reduce the amount of network traffic, a maximal response timeout is desired. In an embodiment, the mobile device dynamically adjusts the response timeout. After sending a long-timeout HTTP request to the server, the device waits up to that maximum timeout for a response from the server 708. If the device does not receive a response within the specified response timeout or the device determines that the HTTP connection has been closed without it having received a response, the device decreases the response timeout for the next request 711. If the device receives a response successfully that indicates that there are no commands waiting to be retrieved by the device on the server, the device increases the response timeout for the next request 710. In an embodiment, the device determines a maximum timeout by increasing the timeout on subsequent requests until a request's response is not received successfully. The maximum timeout is the highest response timeout that completes successfully. If a response is received successfully, the timeout is not increased if the timeout is already maximized 709. Microsoft's DirectPush is an example of a mobile device long-timeout HTTP request system that automatically adjusts the response timeout based on success or failure of requests. (http://technet.microsoft.com/en-us/library/aa997252.aspx)

In an embodiment, the server uses a messaging service to notify a server thread that is waiting for a command to be ready to be retrieved by the device. Example messaging services include RabbitMQ (http://www.rabbitmq.com/), ActiveMQ (http://activemq.apache.org/), ejabberd (http://www.ejabberd.im/) and other messaging or event systems that may be used to notify a server thread about a command being ready to be retrieved. When the server receives a long-timeout request from a device, the thread processing the request registers with the messaging service to receive command-ready events for the device. If another action on the server, such as the user requesting an action via the remote access web page causes a command to be queued to be sent to the device, the server sends a message via the message service notifying the thread processing the long-timeout request. In an embodiment, threads processing long-timeout requests process multiple requests simultaneously in an event-driven fashion. An example library used to provide this functionality is libevent (http://monkey.org/~provos/libevent/).

In an embodiment, long-timeout HTTP requests and responses used to indicate that the server 111 has commands to send to the device 101 are separate from the SyncML HTTP requests and responses. In an alternative embodiment, SyncML HTTP requests use a long timeout to allow the server 111 to send commands to the device 101 without relying on a separate indication system. In this embodiment, the server does not respond with an indication that commands are ready to be retrieved by the device. Instead, the device's request is a SyncML request, and the server's response is a SyncML response containing any commands needing to be sent to the device. In a further embodiment, two SyncML sessions between a device 101 and server 111 can exist. One of the sessions uses long-timeout requests and is dedicated to commands sent from the server 111 to the device 101. Because the server holds the HTTP request open, a client cannot send commands through this session until the server returns a response. A second session is dedicated to commands sent from the device 101 to the server 111. HTTP requests and responses for the second session do not use long timeouts and are only sent when the device 101 has commands to send to the server 111.

2. Connection Robustness

If the mobile device 101 cannot connect to the server 111, it will attempt to reconnect and try sending the latest message in the session again. By automatically reconnecting and resuming a session, the mobile device 101 can tolerate connection outages, a frequent occurrence on mobile networks. The ability to tolerate network failures without having to restart a session allows the system to successfully operate on networks which would otherwise be unusable for large data transfers. For example, if a device is backing up a large file, the file may be broken up into multiple chunks and sent to the server over multiple requests.

If the device's network connection is interrupted while it is transmitting a request to the server, the software on the device reconnects to the network and retries the failed request. Because the session is able to continue, the device does not need to restart sending the file to the server and can resume immediately after the last successfully transmitted chunk. As the session does not depend on a given network connection, the mobile device can lose its network connection, change its IP addresses, or have other connectivity issues and still resume its session with the server.

Figure 8:
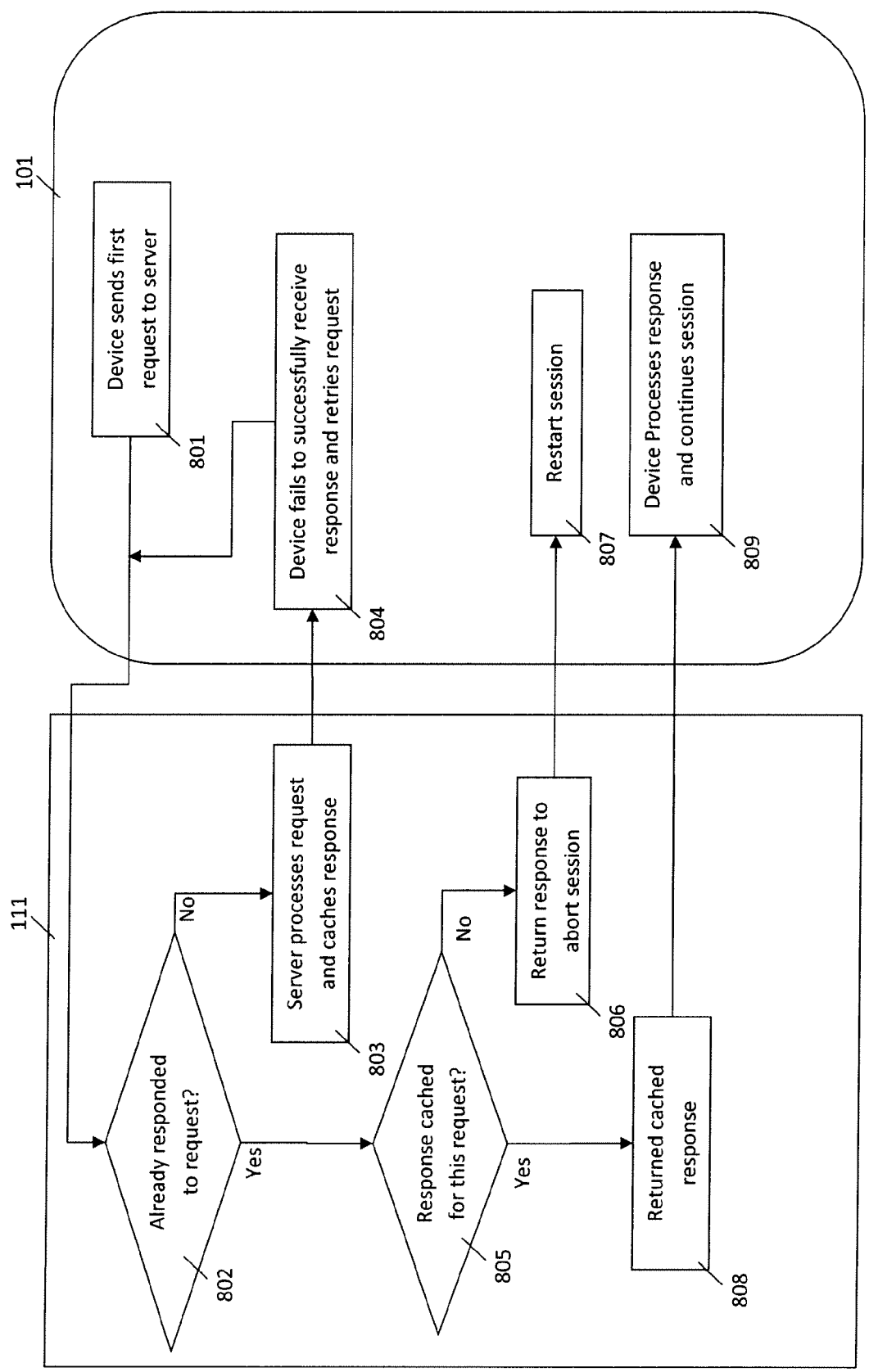
FIG. 8 illustrates a flow chart for caching responses to a request from the device.

In the case where the device's network connection is interrupted while it is receiving a response from the server, the device will retry the request associated with the failed response. In an embodiment, the server will recognize that it has already received the original request and signal for the device to abort its session, not processing the duplicate message. In an alternative embodiment with reference to FIG. 8, the server caches its latest response in the given session so that it may recover from the device failing to receive a response. The device sends a request to the server 801. The server checks to see if it has already responded to the request in the current session by checking the message identifier and session identifier of the request against data stored in a database 802. The database contains the last message identifier and session identifier the server has responded to. If the request has the same message identifier and session identifier as is stored in the database, the request has already been responded to. If the server has not responded to the request (i.e. this is the first time that the client has successfully transmitted this request to the server), the server processes the request, caches the response, and returns the response to the device 803. When caching the response, the server stores the response data, the hash of the request (using an algorithm such as SHA-1), and identifiers such as the session identifier and the message identifier of the request. If the device fails to receive the response, it will retry sending the request to the server 804. After receiving the retried request, the server checks that request's identifiers against the data stored in the database 802. Because the session identifier and message identifier match the last request responded to, this request has already been responded to. The server checks to make sure that the retried request is exactly the same as the request corresponding to the cached response by comparing the hash of the retried request to the hash of the request corresponding to the cached response 805. If there is no cached response available for the message identifier and session identifier or if the hash does not match, the server returns a response indicating for the session to abort 806. The device receives this abort response and attempts to restart the session 807. If there is a cached response for the request available to the server, the server returns the cached response to the device 808. The device processes this response and continues the session without interruption 809. In an embodiment, the server expires cached responses after a given period of time or upon certain events, such as a device becoming disabled or stolen, to prevent stale data from being transmitted by the server to the device. In an embodiment, the server expires cached data in a least recently used manner. In an embodiment, the server only stores a cached response for the last received request in an active session. To store the cached data, the server may use an in-memory caching system such as memcached (http://www.danga.com/memcached/).

3. Device Management System Integration

Figure 9:
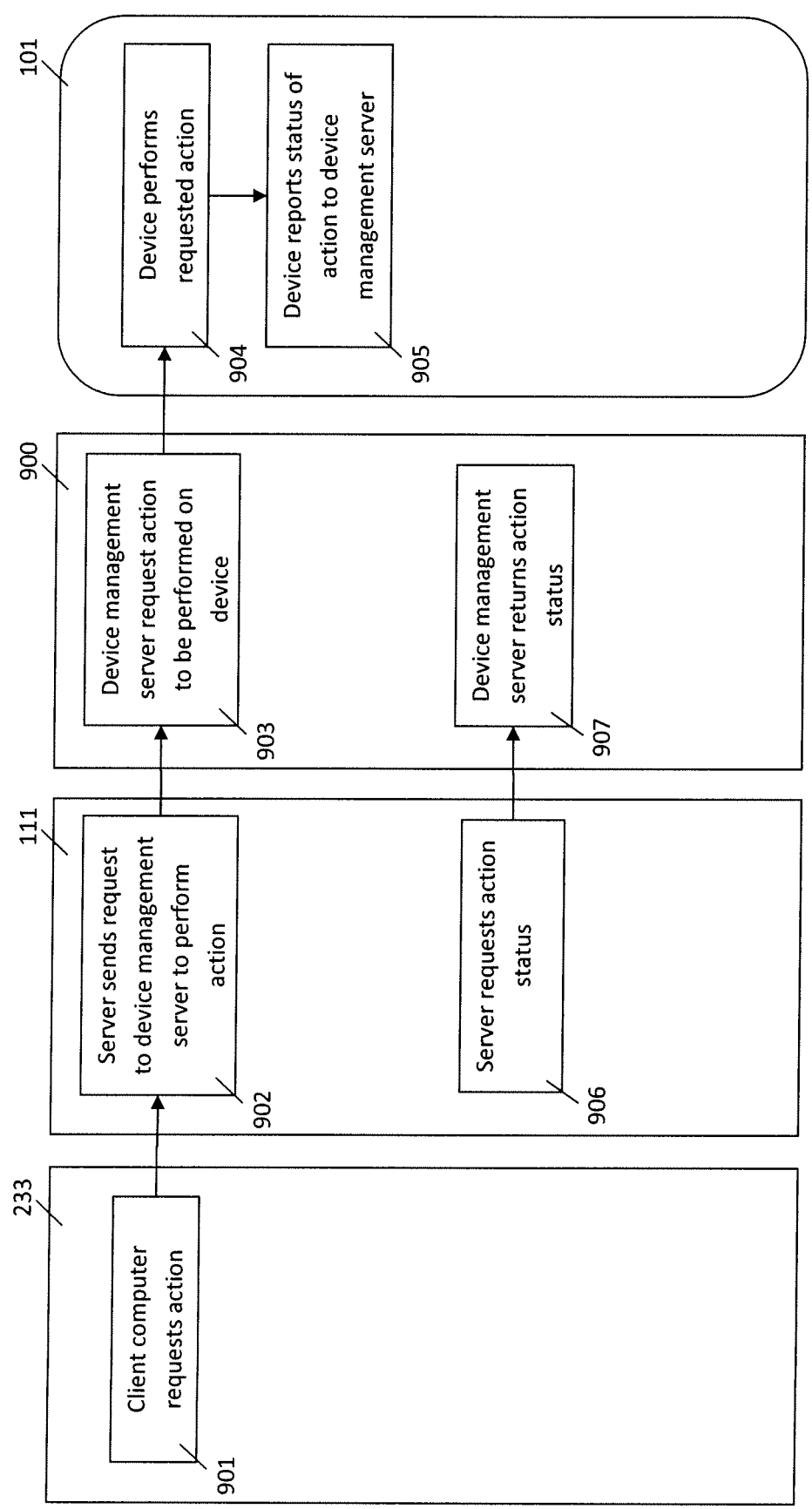
FIG. 9 illustrates a flow chart for communicating with a device management server to perform an action on the device.

For some devices or some types of device deployments, it is not ideal or not possible for the server to directly send commands to software on the mobile device. In an embodiment with reference to FIG. 9, the server 111 communicates with a device management server 900 which has the ability to perform remote actions on a device 101. Because device management systems are often coupled to a specific type of mobile device, the present invention is a centralized way to remotely access multiple types of mobile devices even if each only supports a certain type of management system. In an exemplary embodiment, the server 111 communicates with a device management server 900 using an HTTP API. When the client computer 233 requests for the server to perform a remote action on a device 901, the server receives the request from the client computer and sends a request to the device management server for the device to perform the action 902. The device management receives the request from the server and uses its internal method of contacting the device and inducing the action 903. The device receives the request from the device management server and the device performs the action 904. The device then returns the status of the action to the device management server 905. The server may subsequently query the device management server for the results of the remote action request 906. The device management server returns the current status of the remote action request 907.

If a device management server 900 does not have an API that can be used by the server 111 to perform remote actions, a component 1000 may be installed on the device management server 900 to allow communication with the server 111. In an embodiment, the inventive system includes the component 1000, sometimes called a plug-in or connecter, that can integrate with the device management server 900. The component 1000 can be used to gather information about a device, command actions to be performed on a device, get status about a previously issued command, enumerate what devices a given device management server manages, and perform other actions desired for operation of the present invention. Depending on various factors such as the security requirements and network architecture pertaining to the device management system, the component 1000 may either connect to the server 111 or be connected to by the server 111. Each action performed on a device must be authenticated so that only authorized parties can access the functionality provided by the component 1000 and only authorized receivers can receive commands from the server 111. The authentication process may include sending a shared secret key, a challenge-response system, a public-key system, or any other technology that can be used for authoritative authentication. The connection may use a public-key system such as TLS to provide encryption and authentication. TLS may be used for authentication of both participants in a connection when used with client certificates. If TLS is used without a client certificate, only the identity of one party can be asserted. In this case, TLS may be combined with other authentication mechanisms to provide mutual authentication.

Figure 10:
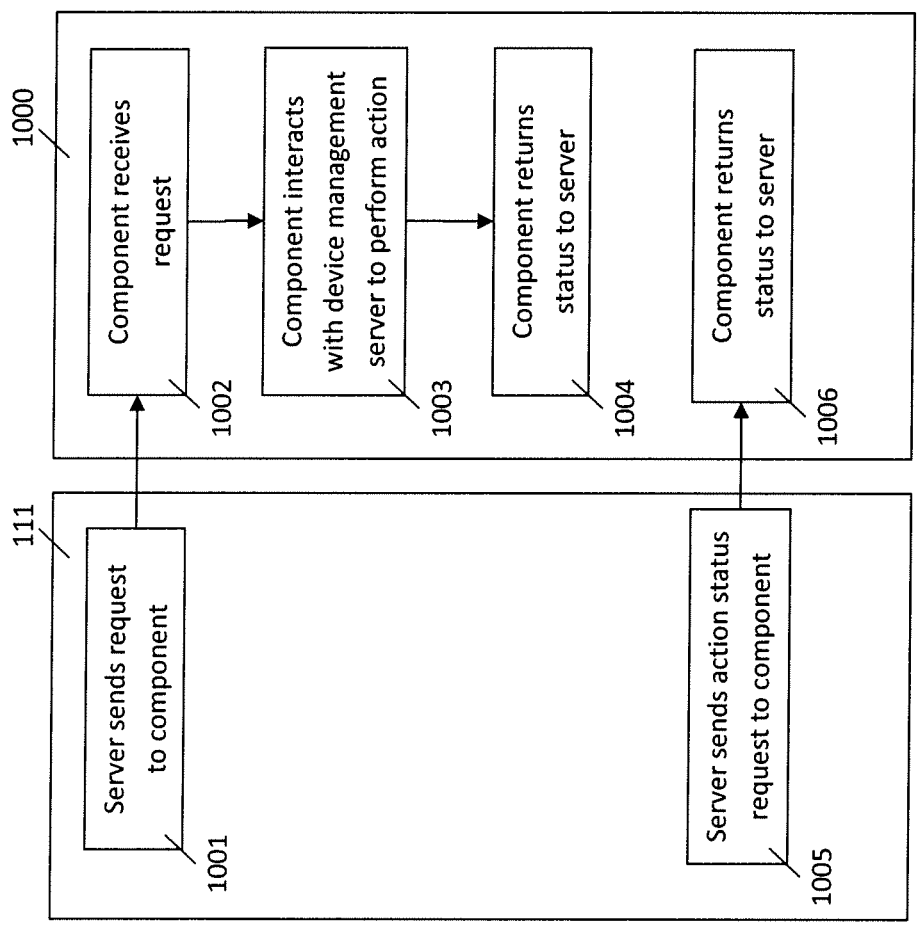
FIG. 10 illustrates a flow chart for the server connecting to a component to perform an action on the device.

In an exemplary embodiment with reference to FIG. 10, where the server 111 connects to the component 1000, the component 1000 exposes its API by acting as an HTTP server. When the server has an action to perform on the device managed by the device management server, the server initiates an HTTP request to the component 1001. To verify the authenticity of both parties, TLS is used. The component 1000 supplies a server certificate and server 111 supplies a client certificate so that both parties may mutually authenticate. Alternatively, the authentication process can use any of the methods defined above. Once the connection is established and mutually authenticated, the server completes its HTTP request to the component. The component receives the request 1002 and interacts with the device management server to perform the action on the device 1003. The component returns status as to whether or not it was able to successfully request that the device management server perform the action on the device 1004. At some point in the future, the server sends another request to the component querying the status of the action 1005. The component returns information pertaining to the progress of the command such as whether it was successfully completed or not 1006. If the command is still pending, the server periodically continues to request status from the component.

Figure 11:
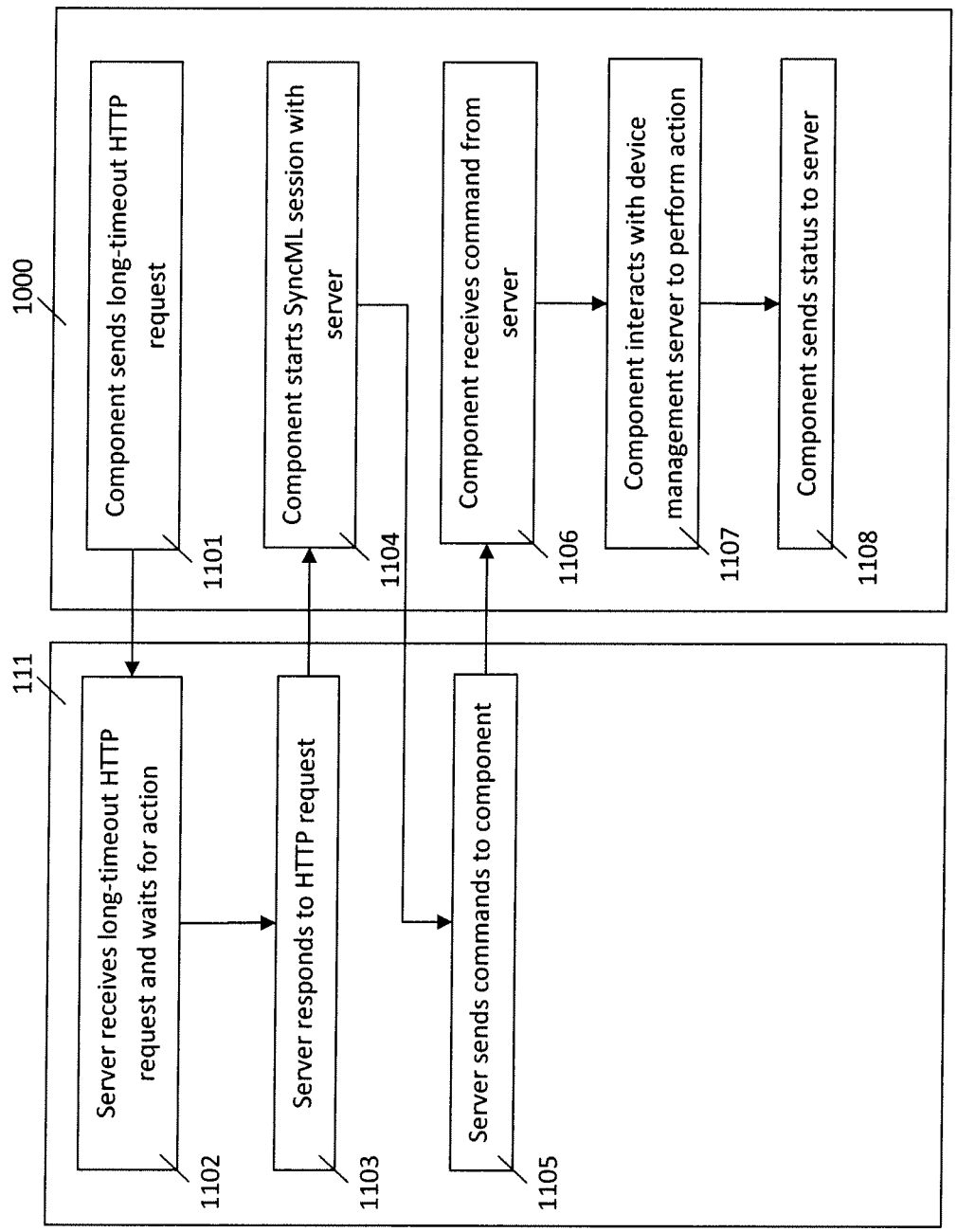
FIG. 11 illustrates a flow chart for a component connecting to the server to perform an action on the device.

In an exemplary embodiment with reference to FIG. 11, when the component 1000 connects to the server 111, the component exposes its API by acting as an HTTP client and connecting to the server. The component uses a SyncML protocol over HTTP to communicate with the server. Ordinarily, the component keeps a long-timeout HTTP connection open with the server 1101. Both the long-timeout HTTP connection and any other HTTP connections may be encrypted using TLS. The server 111 has a certificate which verifies its identity. The component 1000 supplies authentication credentials to the server with each HTTP request. The server receives the long-timeout HTTP request from the component and waits for there to be an action to be performed on a device managed by the device management server 1102. When the server has an action to perform on a device 101 managed by the device management server 900, the server 111 responds to the long-timeout HTTP request with an indication for the component to connect to the server 1103. The component then connects to the server to start a SyncML session over HTTP 1104. In the SyncML session, the server sends a command to the component 1105. The component receives the command 1106 and interacts with the device management server to perform the action on the device 1107. The component returns status as to whether or not it was able to successfully request that the device management server perform the action on the device 1108. The component sends the command progress to the server until the commands have completed successfully or failed.

In an embodiment, the server is used to remotely access multiple devices. Because each device may be accessible from a different management server, the server is able to select which management server a given device corresponds to and send commands to the appropriate server. The server may choose to send certain commands directly to a device and other commands to a management server which corresponds to the device depending on the capabilities of the device, the local software component on the device, and the management server.

Figure 12:
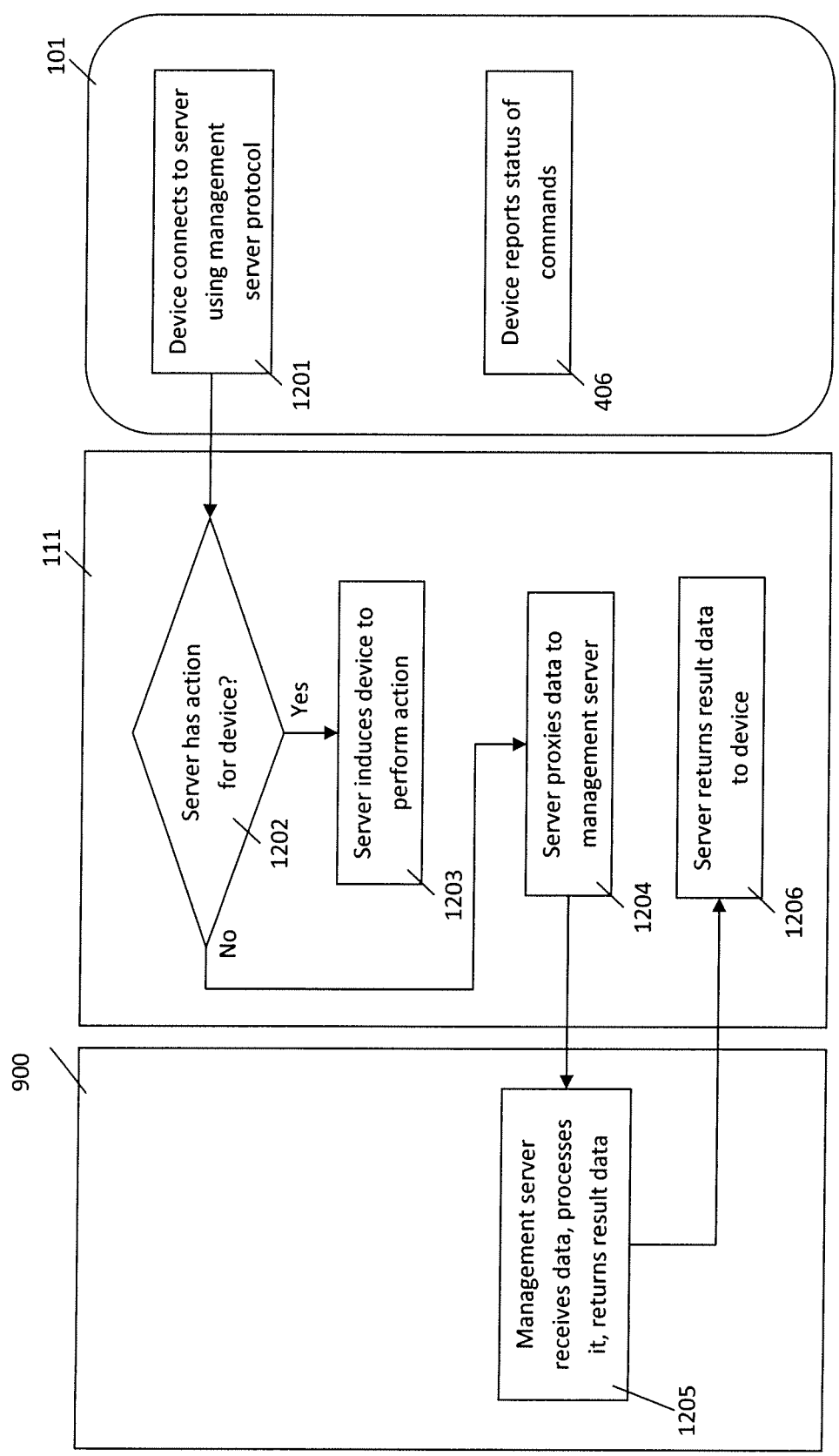
FIG. 12 illustrates a flow chart for the server acting as an intermediary between the device and a device management server.

For some devices or some types of device deployments, it is not ideal or not possible to run a local software component on the device 101. In an embodiment with reference to FIG. 12, the server 111 acts as an intermediary between the mobile device 101 and its management server 900. Without the inventive system, the mobile device 101 directly connects to its device management server 900, such as Microsoft Exchange or Blackberry Enterprise Server. Because an organization may have multiple types of mobile devices and thus multiple management servers, it becomes cumbersome for an administrator to help a user with a lost or stolen mobile device. Furthermore, if an organization only uses one type of management server, and a user loses a mobile device which cannot communicate with that type of management server, the device may not be able to be secured. Instead of connecting directly connecting to its management server, the device connects to the server using its management protocol 1201. The server receives the management protocol data and checks to see if there are actions to be performed on the device 1202. If the server has actions to perform on the device, the server uses the device management protocol supported by the device to induce the device to perform the desired actions 1203. If the server does not have actions to perform on the device, the server proxies the device's management protocol data to the device management server 1204. The management server receives the management protocol data, processes it as normal and returns result data to the server 1205. The server returns the result data returned by the management server to the device 1206. In an exemplary embodiment, the mobile device 101 uses a long-timeout HTTP protocol as its device management protocol. When using the inventive system with the mobile device 101, the mobile device is configured to connect to the server 111 via the device management protocol 1201. When there are no actions for the device 1202, the server proxies the request from the device to the management server 1204. The management server will wait up until the maximum timeout specified in the request before returning data to the server 1205. The server then returns the response from the management server to the device 1206. If the server has an action for the device while the management server is waiting to return a response, the server will respond to the device's request and close its connection with the management server, even though the management server did not return a response. When there are actions for the device 1202, the server does not proxy the request and instructs the device to execute the action 1203. When finished with sending any actions to the device and receiving any associated status information, the server returns to normal, proxying requests and responses between the device 101 and the management server 900. In an embodiment, there is no device management server 900, and the server 111 acts as a device management server 900 and does not proxy requests.

4. Push Service Integration

Figure 13:
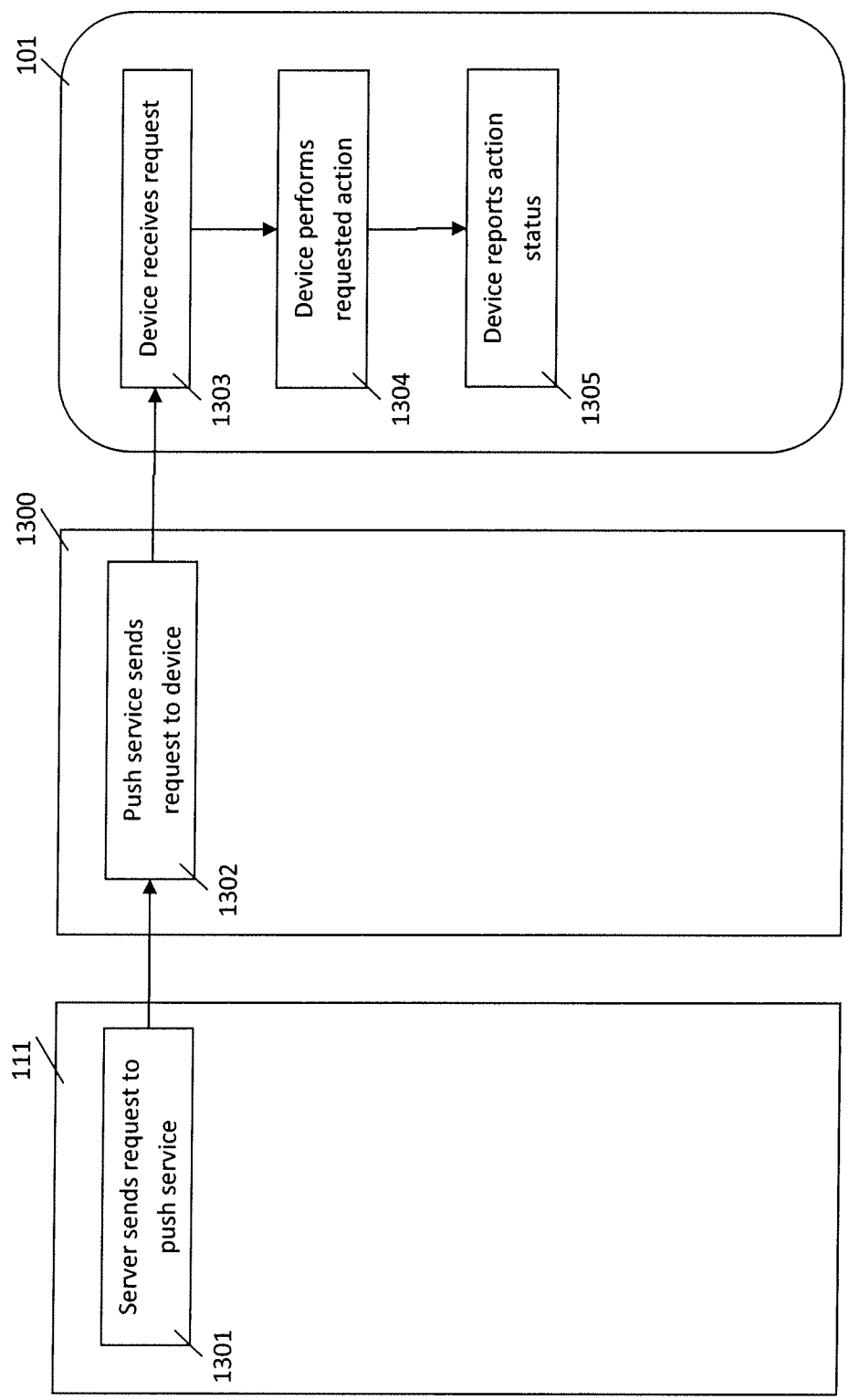
FIG. 13 illustrates a flow chart for the server interacting with a push service to perform an action on the device.

For some devices, it is not possible or not desirable to run software in the background which is able to receive connection indications from the server 111 or to connect to the server 111 periodically. Such devices may allow the server 111 to request that an indication be pushed to the device 101 via a push service 1300 provided by the device's manufacturer, service provider, or other party. In an embodiment with reference to FIG. 13, the server 111 uses this push service 1300 to indicate for the device 101 to connect to the server 111. The server first sends a request to the push service requesting that an application be launched on the device 1301. The push service sends a request to the device instructing the device to perform the requested action 1302. The device receives the request 1303 and launches the application specified in the request 1304. Launching the application causes the device to connect to the server using an HTTP based protocol to send and receive commands and responses. In an alternative embodiment, the push service 1300 allows the server 111 to directly request that actions be performed on the device 101. In an example, the push service 1300 allows the server 111 to wipe the device 101, play a sound on the device 101, and lock the device 101 directly through the push service 1300 without requiring software on the device 101 to connect to the server 111 to receive commands after receiving an indication. The device sends a request to the push service for the device to perform an action 1301. The push service sends the request to the device 1302. The device receives the request 1303 and performs the action 1304. After the device performs the requested action, the device reports the status of the action to the push service 1305. The server connects to the push service 1300 to receive the status of the requested actions. Alternatively, the push service 1300 connects to the server 111 to inform it of the status of the requested actions.

For actions indicated by a push service 1300 which report small amounts of data back to the server 111, such as retrieving location-related information from the device 101, it may be desirable to use an HTTP request/response API instead of a persistent session protocol such as SyncML layered on top of HTTP. In an embodiment, the push service instructs the device to perform an action such as gathering location-related information 1302. After receiving the request 1303 and gathering the location-related information, the device connects to the server using HTTP and posts the location-related information along with authentication information to the server in a structured data format such as XML or JSON 1304.

C. User Interface and Functionality

Figure 5:
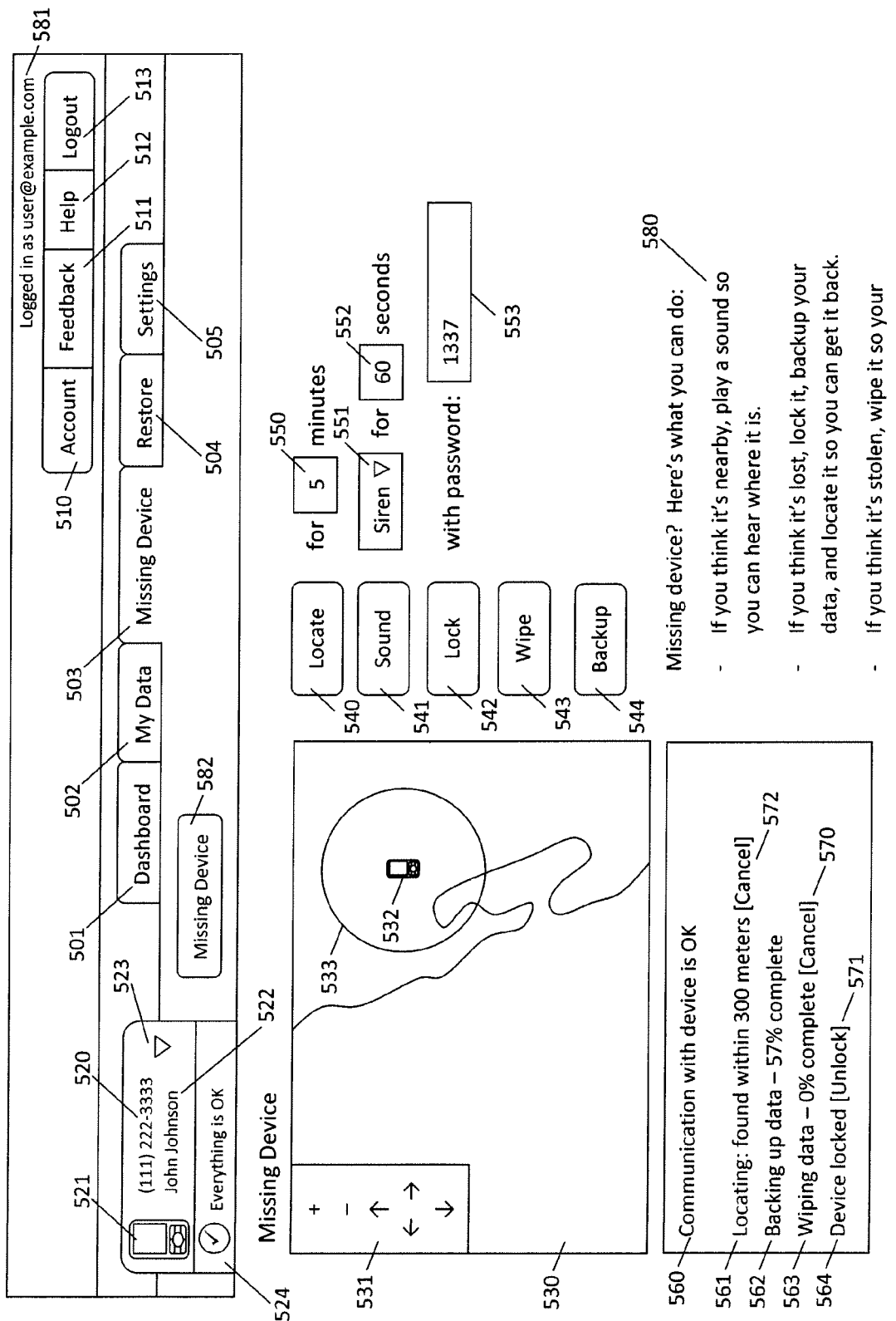
FIG. 5 illustrates an exemplary web page having a GUI with remote access controls for the mobile device.

With reference to FIG. 5, an exemplary mobile device remote access web page is illustrated. The web page provides general management and assistance functionality. The user may click Account 510 to view or change their account details, Feedback 511 to comment on the functionality of the system, Help 512 to get assistance with the functionality provided by the system, and Logout 513 to log the user out of the system. The currently logged-in user is identified on the web page 581. A currently selected device is identified by its phone number 520 and name 522. The identity of the selected device is graphically illustrated by a picture of the device if the server can identify the model of the device 521. The status of the currently selected device is also indicated 524. In this example, the status 524 informs the user that "Everything is OK". If there were a security or other problem with the device, the status 524 would indicate the severity of the problem. The currently selected device may be changed by pressing the change device button 523 and selecting a different device. The change device button 523, when clicked, shows a dialog with some or all of the devices accessible by the user. When the user selects one, that device becomes the currently active device.

The web page provides several tabs each displaying different information and controls relating to the currently selected device. The primary remote access controls for recovering and securing a lost or stolen device are on the "Missing Device" tab 503 of the web page. The user can utilize functionality provided by the present invention by clicking on other tabs which include "Dashboard" 501, "My Data" 502, "Restore" 504, and "Settings" 505 . For example, clicking "Dashboard" 501, allows the user to view an overview of the security and status of the currently selected device. Clicking "My Data" 502 allows the user to view the device's backed up data which may include types such as: pictures, videos, documents, audio, call history, SMS messages, contacts, web favorites, settings, programs, and other data. Clicking "Restore" 504 allows the user to restore data backed up from the currently selected device to that device or another device. "Settings" 505" allows the user to view and change settings associated with the currently selected device. For example, the user may set the frequency and schedule of backups, the types of data backed up, and the connection preferences associated with backups. Connection preferences may include only backing up while connected to the server via Wi-Fi or a cellular network where the device is not "roaming". Various other settings can be made through the system, including settings for Anti-Virus, Attack-Protection, Firewall, and other functionality relating to the currently selected device.

In this example, the missing device web page contains one view 582. The web page can also be configured to contain multiple views. For example, the functionality provided by the present invention may be split into multiple views that are accessed by separate documents requested from the server or dynamically displayed elements in a document. Thus, the displayed web page is intended to represent various different possible dynamic displays and not be limited to a static web page display. In an embodiment, when the user clicks on an element in a web page which represents selecting a new view, the client computer requests a document from the server to dynamically change appropriate elements on the page to display the new view being selected. In an alternative embodiment, when the user clicks on an element in a web page which represents selecting a new view, the client updates the visual display of the page with data already loaded by the client computer. In an alternative embodiment, when the user clicks on an element in a web page which represents selecting a new view, the client requests a document from the server to load an entirely new page on the client computer.

In this example, the user selected the "Missing Device" tab 503. The web page displays suggestions for finding and securing the phone based upon the circumstances in which the phone was lost 580. The user can select any of the desired remote access commands including: locate the device 540, play a sound from the device 541, lock the device 542, wipe the device 543, and backup the device 544. This listing of commands is exemplary only, and is not intended to recite all commands that are the subject of the present invention. The user clicks buttons corresponding to the desired actions which causes the action to be performed. Upon clicking a button corresponding to an action, the web page may display a dialog box which requires the user to confirm the action or supply additional information. The dialog box allows the inventive system to prevent accidental actions which could be harmful if done unnecessarily. In this example, some actions have additional options which may be configured by the user. Locate, for example, allows the user to select for how many minutes to locate the device 550. After the server begins attempting to perform the action, its status is displayed. If the device has not yet started the action, it may be cancelled 570. While an action is being performed, the web page may disable the button corresponding to that action until the action is finished.

1. Location

The web page also includes a map 530 that shows the physical location of the mobile device. In an embodiment, the mobile device obtains location-related information and transmits this information back to the server which displays the mobile device location on the map 530. The location-related information can be data from a GPS receiver on the mobile device or any other type of location detection mechanism, including but not limited to Wi-Fi access point signal information, cell-tower signal information, and other radio signal information. The mobile device location is indicated as an icon 532 on the map 530. The location action may be initiated manually from the remote access web page or automatically by the device or server.

To locate the device, the user clicks on the "Locate" button 540 to request current location-related information from the mobile device. The locate command can be terminated by clicking on the cancel button 572. After receiving the location request, the server transmits a command to the mobile device requesting location-related information. The mobile device receives the location-related information command, obtains the location-related information and transmits the location-related information back to the server. While the device is obtaining location-related information, it may report its progress to the server. The location-related information may include the physical location of the device or data that must be further processed to obtain the physical location. The location-related information may also include accuracy information regarding the physical location or other data reported to the server. The web page displays the status of the mobile device location detection 561. The web page indicates that the system is "locating." The location status will be reported or displayed as "locating" while the location information is being reported by the device, "location unknown" when the location retrieval fails, or "done locating" when the location has finished. If the device reports accuracy information, the map has a zone of confidence 533 around the estimated location to inform the user of the region the device is expected to be within. Such a zone may be represented as a circle around the estimated location. The server may also display multiple locations transmitted by the device to show the movement of the device over a period of time. The multiple locations displayed on the map may show the time the device was at the location and/or display a line connecting the location points in chronological order. In an embodiment, the server can send a command to the device for the device to report location-related information to the server for a period of time. The user may specify the duration of the location on the remote access web page 550. During the time period of the location request, the device periodically sends updated location-related information to the server. To protect user privacy, location information sent by the device and stored on the server may be discarded after a period of time.

The user can use pan, zoom in and zoom out controls 531 to alter the scale and boundaries of the map 530 to display the mobile device icon 532 in the desired manner on the map 530. For example, the user can use the display commands 531 to zoom in on the map 530 so that the user can more easily identify the streets and addresses in the proximity of the mobile device. The location information can be useful in determining if the mobile device is lost or stolen. In an embodiment, the user may input addresses or coordinates of locations known to the user such as the user's home, office, or known areas associated with the user such as schools and houses of friends and relatives. A location can be defined by recording the coordinates through the mobile device or by entering the location manually. A location's area can be defined by specifying a radius around a given location's coordinates. The system may identify these locations on the map 530 and if the mobile device is detected to be within any known location areas, the system may identify the location by name. If the system detects that the mobile device is located in an area unknown to the user this information may suggest that the mobile device is stolen and data on the mobile device may be at risk.

It may be desirable to automatically change the security policy of a device depending on its location or send a notification if the device enters or leaves a given area. This functionality may reduce risk by setting a lenient security policy while at an office environment and a strict security policy while outside of the office. Additionally, this functionality may help proactively identify lost or stolen devices before the device is reported missing by its user. In an embodiment, the device periodically sends location-related information to the server. The server processes the information and compares the device's location to a set of location areas pertaining to the device. If the device is in a location area that pertains to a specific security policy, the server sends a command for the device to change its security policy. If the server is configured to notify the user if the device leaves a given location area, the server will send an email notification describing the device having left the given location area. If the server is configured to notify the user if the device enters a given location area, the server will send an email notification describing the device having entered a given location area. If the device's location is not known with extreme accuracy, the device's presence or absence in a given location area may be determined by the probability of a device being in a given area given its current location and the uncertainty of that location. In an alternative embodiment, the device's comparison of its current location to known locations for purposes of notifications policy changes, or other actions may be performed on the device. In this case the server may also be notified of any location-related changes or notifications.

If a device is lost, it is a significant problem if its battery runs out before one or more remote actions have been performed to secure or recover the device. In an embodiment, the device automatically sends its current location-related information to the server when the device's battery is low. If the user later decides to attempt to locate the phone, but the battery has run out, the server displays the last known location on the remote access web page. In an embodiment, the device automatically sends its current location-related information to the server on a periodic basis. The user may configure the time interval by which the device transmits location-related information to the server. If the user decides to locate the phone, but the device is unable to communicate with the server for any reason, the server displays the last known location on the remote access web page.

If there are multiple types of location systems available on a device, it may be desirable to wait for a more accurate system such as GPS or Wi-Fi to return location-related information instead of returning the first available, yet usually less accurate, cell-tower location-related information. It is also desirable, however, to have a location quickly, even if it is less accurate than one that may take more time. The processing of information from these various location systems is described below. In an embodiment, the device utilizes multiple systems which provide location-related information to get the most accurate information available at a given time during the course of a location request. When the device receives a command to locate itself for a period of time, it starts one or more available systems which may be able to provide location-related information. During the period of time that the device has been requested to send location-related information to the server, the device will periodically send the most recent data available from one or more location information systems. In an example, the server requests for a device which has GPS and a mobile network radio to send location information for 5 minutes. When the device first receives the command, it attempts to use GPS and the device's mobile network radio to retrieve location-related information. Because GPS has to acquire satellite signals, it may take several minutes before an accurate location is available. The device's first report to the server contains only cell-tower location-related information. If, before the next report is sent to the server, GPS has acquired a fix, the device will send both GPS and cell-tower information to the server. The device will continue periodically sending reports containing available location-related information until the location time period is finished.

While GPS is often the most accurate location system, there are various situations, such as when the device is indoors or in an urban area, when GPS cannot obtain an accurate fix. Other location systems are desirable when GPS is not available or is waiting to acquire a fix. Because wireless infrastructure stations such as Wi-Fi access points and cellular network towers transmit identifiers that are usually globally unique, the identifiers and associated signal characteristics detected by the mobile device can be used to estimate the location of the device. In an embodiment, when the server requests that software on the device gathers location-related information, the software on the device retrieves identification and signal information for nearby Wi-Fi access points and cellular network towers and their associated signal characteristics detected by the mobile device. For each Wi-Fi access point, the device reports the access point's BSSID to identify the access point and the device's received signal strength for that access point to characterize the signal. For a nearby cell-tower, the device reports different information depending on the cellular network type. For example, in GSM-based networks, the device may report a cell tower's mobile country code (MCC), mobile network code (MNC), location area code (LAC), and cell id (CID) to identify the tower along with the timing advance and signal strength to characterize the device's connection with that tower. For example, in CDMA-based networks, the device may report a cell tower's mobile country code (MCC), system ID (SID), network ID (NID), and billing ID (BID) to identify the tower along with the signal strength to characterize the device's connection to the tower. For CDMA, GSM, and other networks, there may also be additional parameters such as the absolute signal level, the signal level relative to noise, and the bit error rate reported depending on the software and hardware present on the device. If information regarding multiple cellular network towers is available, the device may report information for each cell tower to the server for increased accuracy.

If the device has a built-in location mechanism, such as one provided by the network operator, device manufacturer, or other party, the software on the device may use the built-in location mechanism alone or in conjunction with other location systems. In an embodiment, when the software on the device receives a command from the server to report location-related information, the device initiates a request to the built-in location mechanism to retrieve the device's location. When the built-in location mechanism returns a location, the software on the mobile device reports it to the server. While the built-in location mechanism is determining the device's location, the software on the device may use GPS, Wi-Fi, or cell-tower location systems as well in order to maximize the speed and accuracy of location-related information.

Figure 14:
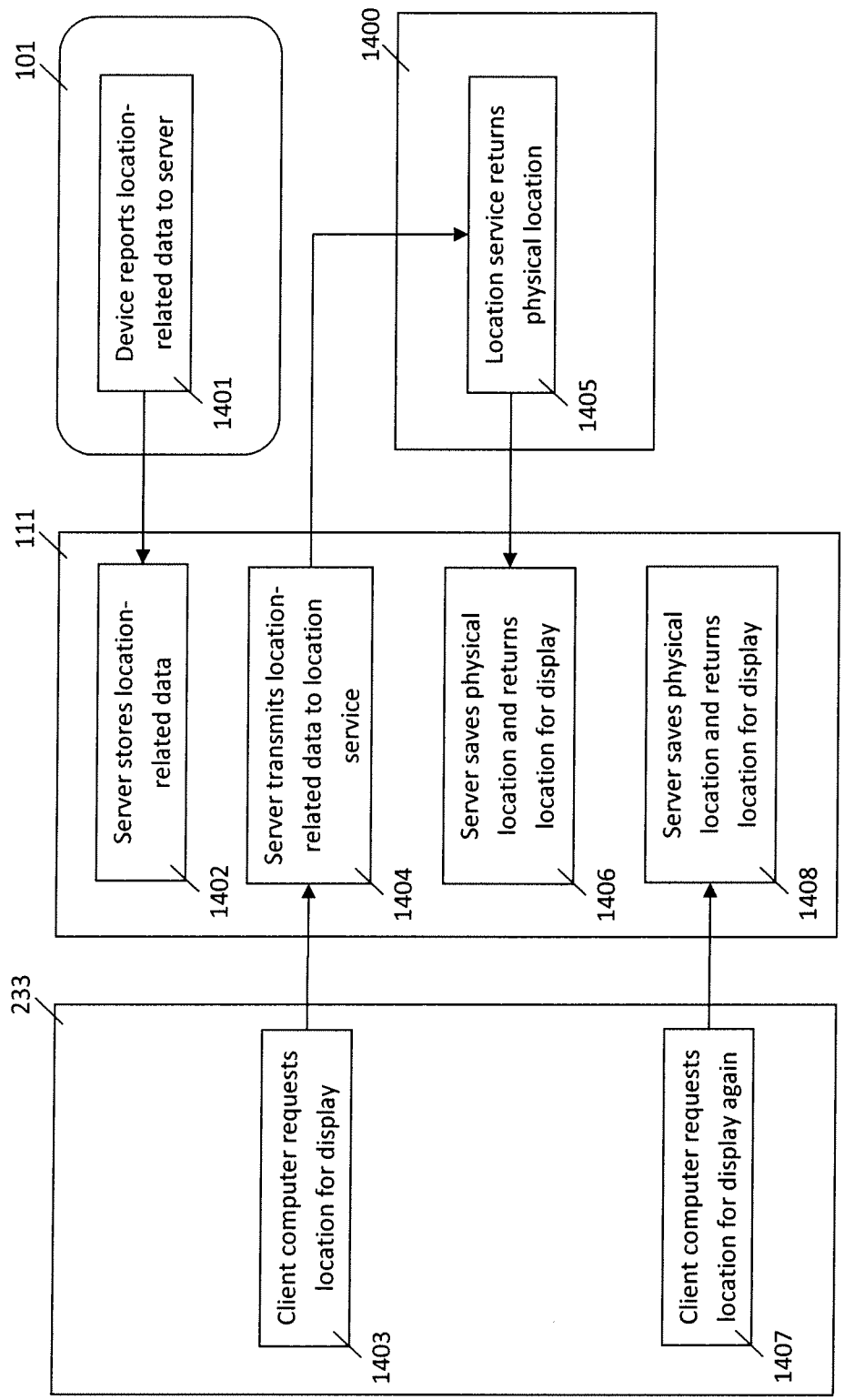
FIG. 14 illustrates a flow chart for interacting with a location service to provide the physical location of the device.

In the case of GPS or the device's built-in location mechanism, the device 101 directly reports the physical location and associated data to the server 111. In the case of Wi-Fi, cell-tower, or other similar location systems, the device 101 reports information to the server 111 which must be processed to determine the physical location of the device. In an embodiment with reference to FIG. 14, the server 111 utilizes an external location service 1400 which is accessible via an HTTP API to estimate the device's location based on one or more location systems. When the device reports location-related information to the server 1401, the server stores the information in a database 1402. The next time the client computer 233 requests to display the location reported by the device 1403, the server contacts the external service using its HTTP API and transmits some or all of the location-related information provided by the device 1404. In order to transmit this information, the server may need to process the information and transform it into a format compatible with the external service API. When the external service returns the physical location of the device 1405, the server saves it in a database and returns the location to the client computer for display on the web page 1406. Because the physical location output by the external service is stored in the database, the next time the client computer requests that location from the server 1407 and the device has not reported any new location-related information, the server returns the location from the database 1408 and does not need to request the same location multiple times from the external service. If the third party service returns simply location coordinates, the remote access web page displays the estimated location on a map. If the service also returns an interval of confidence, the server stores the interval of confidence, and the remote access web page displays a confidence region on the map. If the service returns an address or description of the estimated device location, the server stores this data, and the remote access web page also displays that information.

In addition to or instead of using an external service to determine the physical location of the device from location-related information that does not directly specify the device's physical location, the server may use various systems to estimate the physical location of a device. These systems may require a database of known location information relating to Wi-Fi access points and cell-towers. The database can include locations of cell-towers and associated identifiers, locations of Wi-Fi access points and associated identifiers, cellular network signal characteristics at known physical locations, and other similar information. In an embodiment, the database is used to prepare or train a fuzzy system, neural network, or other system which may be used to estimate the location of a device. When the server needs to determine the location of the device, the system is already prepared and requires minimal computational power to estimate the device's location. In an additional embodiment, the server may estimate the device's location based on its proximity, as determined by signal strength or other signal characteristics, to one or more items in the database with known locations. In an embodiment, when the device sends location-related information to the server, the server sends a portion of the database corresponding to an area around the device's current location to the mobile device. The device can perform location processing without having to communicate with the server while it is in the area corresponding to the selection of the database. When the device moves out of the area, it can request a selection of the database corresponding to the new area from the server.

Mobile device location is an important part of the present invention. Providing the owner of the lost or stolen mobile device with accurate data about its location allows the owner to make careful decisions about the actions to take with respect to the mobile device security. Some suitable geo-location capabilities that can be used with the present invention are the services provided by Loopt, Inc.; Skyhook Wireless, Inc.; Mexens Intellectual Property Holding, LLC; and Google, Inc. Mexens Intellectual Property Holding, LLC holds U.S. Pat. No. 7,397,434 and True Position, Inc. of Berwyn, Pa. also has a substantial portfolio of issued U.S. patents, of which U.S. Pat. No. 7,023,383 is exemplary, both of which describe and claim a variety of non-GPS based mobile device geo-location techniques.

2. Sound

If the user loses the device and believes it to be nearby, the device can be instructed to emit a loud sound 541. Because many users keep their mobile devices in vibrate-only or silent ringer modes, simply calling the device's phone number is not a practical way to find a nearby missing phone. In an embodiment, upon receiving a command to start playing a sound, the local software component on the mobile device will turn the device's speaker to maximum volume and start playing the requested sound. The mobile device can be configured to stop the loud sound after a predetermined period of time or when the user presses a button on the mobile device. The remote access component on the mobile device can interpret the button actuation as the device being found.

If the user wishes for the device to play a specific sound, the present invention allows the user to choose or record a custom sound which will be played on the mobile device. In an embodiment, the remote access web page allows the user to select a file on his or her local computer to upload to the server. The server re-encodes the uploaded sound into a format which can be played on the mobile device if it is uploaded in a format which is not ideal to be played on the mobile device. In an embodiment, the server allows the user to record a sound on his or her computer to be played on the mobile device. Using a browser add-on such as Adobe Flash, a recording application can be embedded into the remote access web page which allows sound to be recorded and sent to the server. After recording a sound, the user may give the sound a name so that it is identifiable in the future. The server may store sounds uploaded or recorded by the user so that the user can have the device play his or her previously uploaded sounds in the future. The user is given a choice of sounds to play on the mobile device which may include default sounds as well as any uploaded or recorded sounds that belong to the user 55 1. If the user selects a default sound that is already stored on the device, the server sends a command to play that sound to the device. If the user selects a custom sound or other sound that is not on the device, the server sends a command to play the sound along with the data for the custom sound. In an embodiment, the web page allows the user to control if the sound is played in a loop, and if so for how many times or for how long to loop for 552.

3. Lock

If the user believes that the mobile device is not within audible range and wants to recover it without wiping the onboard data, a lock command 542 may be issued to the device. The lock command 542 deactivates the controls of the mobile device but leaves the stored data intact. In the locked state, functional control based upon the input keys is eliminated except for the ability to make calls to emergency numbers or to enter a password to unlock the device. The mobile device cannot be used to make phone calls (except for calls to emergency numbers), transmit text messages, display information, play media, or perform any other normal mobile device functionality. Because the locked mobile device may not be valuable or useful, a thief or unauthorized user may abandon the mobile device. If the mobile device is retrieved by the owner, the remote access web page can be used to unlock the mobile device to restore the normal functionality. In this embodiment, the user may use the remote access web page to unlock the device 571. The mobile device may also allow the entry of authentication information such as a password to allow the user to unlock the device without requiring access to the remote access web page. In an embodiment, the remote access web page allows the user to select a password which is required to unlock the device when initiating the lock command 553. The password on the remote access web page may be initially populated with a default value.

In an embodiment, the mobile device is configured to display information such as how to contact the owner when the local software component locks the mobile device. The information displayed on the device may include an email address, phone number, or mailing address. Alternatively or in addition, the remote access component on the device may have a method by which someone who finds the missing device can easily call a pre-defined phone number to reach the owner of the device or a recovery service.

4. Backup and Restore

The backup data command 544 causes the mobile device 101 to transmit some or all of its stored data to the server 111 where it is securely stored in a mobile device backup database. The stored data may include documents, pictures, call history, text messages, videos, audio, notes, internet favorites, contacts, calendar appointments, to do list items, applications, settings, credentials, and other data that may be stored on a mobile device. The stored data may be stored on the device's internal memory, a SIM card attached to the device, a removable or non-removable storage card, or any other storage system associated with the mobile device. The backup data stored on the server can be restored back to the mobile device if it is recovered or alternatively restored to a new replacement mobile device if the lost mobile device is not recovered. In an embodiment, the backup system can be set to perform regular backups at set time intervals. Because only some of the stored data may change or be added between each backup, the system may only transfer new data or data that has been changed since the last backup was performed. In an embodiment, the local software component 175 on the mobile device tracks the data that has previously been backed up to the server in a database which is stored on the device. When the backup is requested, the local software component compares information in the database to data stored on the device to determine what changes need to be reported to the server. In an embodiment, the local software component 175 reports the current state of all the data on the mobile device to the server. The server software 117 compares this report to the current data stored on the server and notifies the device which data needs to be backed up to the server. By only backing up data that has changed since the previous backup, the system reduces the amount of time and energy required to perform incremental backups. Because a lost mobile device may have only a limited amount of energy available from its battery, it is beneficial to minimize the impact of performing a backup.

Figure 17:
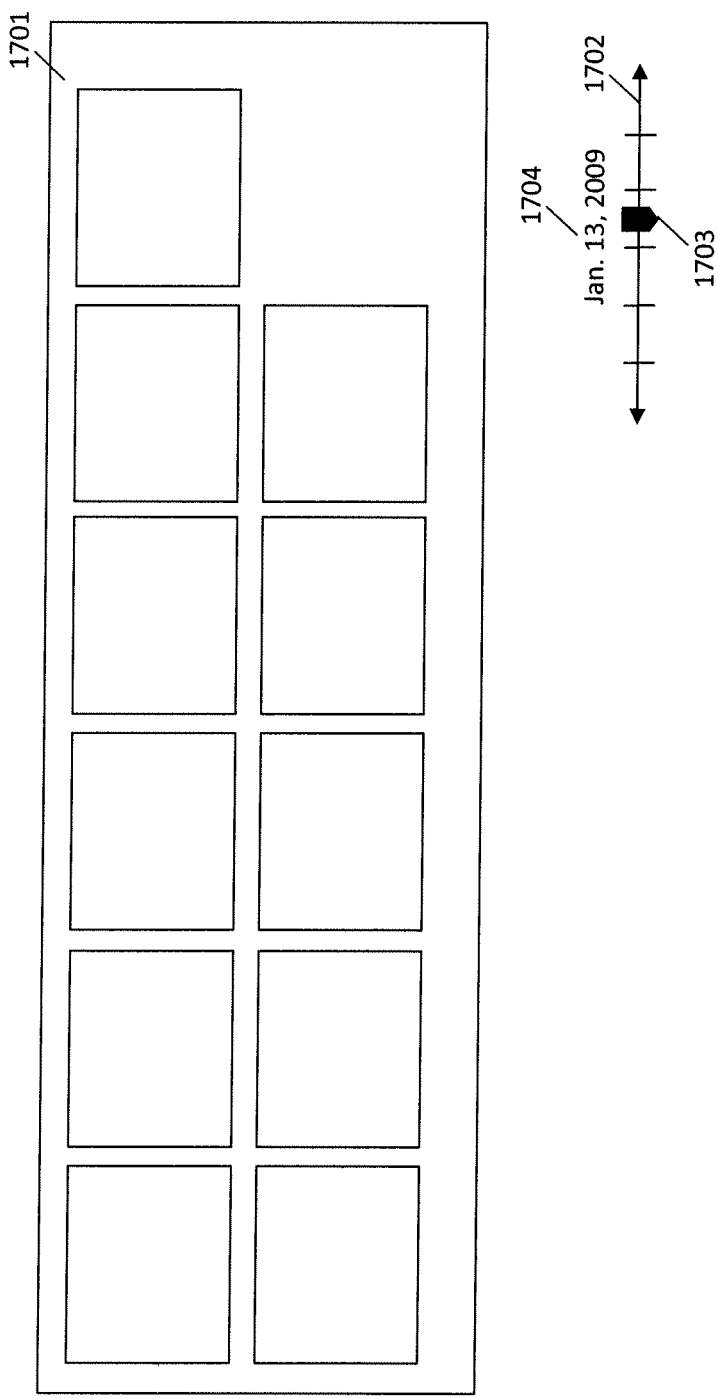
FIG. 17 illustrates a data viewing web page that can be viewed by the device.

To enable the recovery of data that was deleted or overwritten on the device, the server stores past versions of data that are not present on the device. In an embodiment, when the device informs the server that data has been deleted on the device, the server marks the backed up data in the server's database as deleted, but does not remove the data. When the device informs the server that data has been updated or otherwise changed on the device, the server marks the previous version of the data in the database as changed and adds the latest version of the data to the database. In order to efficiently handle multiple versions of data, the backup database on the server stores meta-data relating to the data backed up from the user's device. The meta-data includes the time when the data was first present on the device or was first sent from the device to the server. The meta-data also includes the time when the data was removed or replaced on the device or the time when the replaced data was sent to the server. The combination of the two times allows the server to be able to query the database to determine what data was active on the device at any given time. Any data that the device has not reported as deleted or modified has a started time but no ended time. Data that has been replaced or changed has an associated identifier which can be used to find the next version of that data. In an embodiment with reference to FIG. 17, a data viewing web page generated by the server 111 allows the user to view the data on the device at a given point in time. The data viewing web page visually displays data from the currently selected time period 1701. Individual data items are each represented visually on the web page. The data viewing web page has a user interface control such as a slider or calendar which allows the user to select a date or specific time from which to display the backed up data. The bounds of the time the user interface control is able to select are set to the earliest and latest data present on the currently selected device 1702. When the user changes the user interface control to select a given time 1703, the data viewing web page changes either by reloading or by updating itself by using a technology such as JavaScript or Adobe Flash. The time displayed on the page changes to represent the currently selected slider date 1704. The data viewing web page may allow the user to view a timeline showing when data has been changed, added, or deleted from the device. Changes to data may appear as events on the timeline. The events on the timeline may be shown as a visual representation of the data being changed, added, or deleted. In an example, the visual representation includes a thumbnail icon of the data being changed, added, or deleted. The data viewing web page may allow the user to select a specific data item and view previous versions of that data item. The previous versions may be displayed as a list with each item representing a previous version of the data item. Each previous version may be visually represented with a thumbnail of the data.

Figure 15:
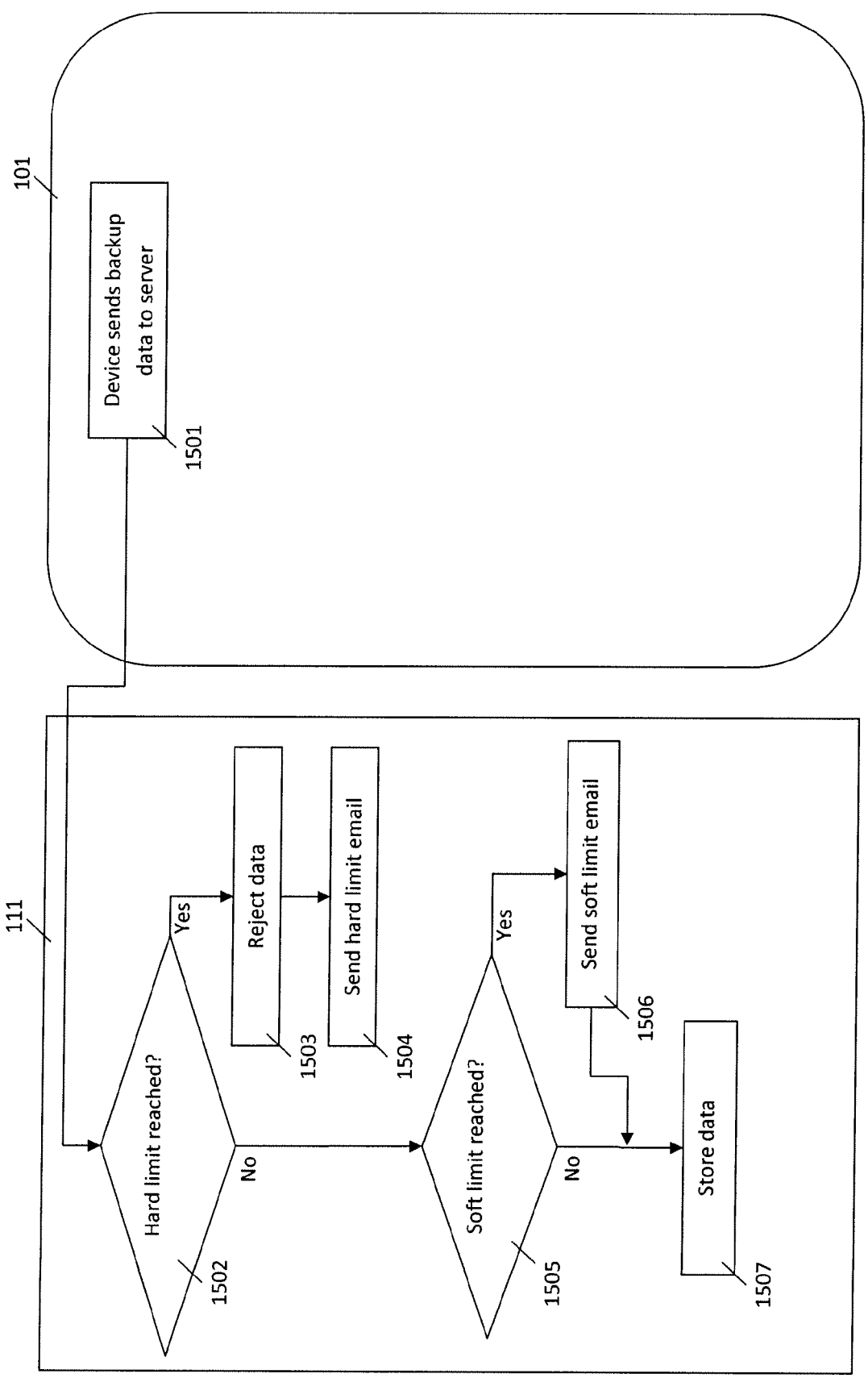
FIG. 15 illustrates a flow chart for enforcing data quota on the server.

In order to ensure that users back up no more than their allotted amount of data, the server may enforce a quota which determines how much data a device or set of devices is allowed to store on the server. In an embodiment with reference to FIG. 15, the data storage quota for a device is defined in terms of total data size and number of data items stored. The device's quota has a soft and hard limit, the soft limit smaller than the hard limit. A quota is considered reached if either the total data size or number of data items stored exceeds a threshold specified for either value. When the device sends backup data to the server 1501, the server checks to see if the device has reached its hard limit of data storage on the server 1502. If the device has more active data being backed up than the server has allocated to the device's hard-limit quota, the server will deny requests to back up the data 1503. In an embodiment, the server sends an email, informing the user that some data from the device cannot be backed up 1504. The email corresponding to reaching the hard limit contains a link which allows the user to increase the data storage quota allocated to his or her device or delete data associated with the device. If the device has not reached its hard limit, the server checks to see if the device has reached its soft limit 1505. If the device has not reached its soft limit, the server stores the data 1507. If the device has reached its soft limit, the server sends an email informing the user that the device's quota has been reached 1506 and stores the data 1507. The email corresponding to reaching the soft limit contains a clickable link to the server which allows the user to increase the data storage quota allocated to the device or delete data associated with the device to bring the device under the soft limit. The email informs the user that the server will automatically remove old data that is not active on the device to make sure that new data can be backed up from the device. If the user does not perform actions to bring the device's data under the quota soft limit after a period of time, the server will automatically remove old data to bring the device's data under the quota limit. This removal process only removes data that has been updated or deleted. Data that is currently present on the device (i.e. active data) will not be removed. The email may show some or all of the data items that will be lost if the user does not bring the device's data under the soft limit before the server begins removing data.

Once the device has backed up data to the server, the server may allow the user to restore some or all of the data that has been backed up to a new device or to the device from which the data originated. When data is restored to a device, the data is sent from the server to the device, with instructions for the device to store the data. In an embodiment, the server can generate multiple web page interfaces by which the user can restore data. In one interface, the user can instruct the server to restore all of the data backed up from one device and active the restoration at a given time to that device or another device. In another interface, the user can instruct the server to restore certain categories of data backed up from one device and active at a given time to that device or another device. In a further interface, the user may view individual pieces of data and select one or more data items backed up from one device to be restored to that device or another device. This individual item restore interface also allows the user to download one or more items stored in an archive such as a ZIP file. In an embodiment, the individual restore interface is integrated into the data viewing web page so that data can be restored while it is being viewed. All of the restore interfaces may allow the user to select a specific time or time period from which to restore active data from. Active data at a given time is data that has been backed up to the server before the given time and considered to be present on the device as of the given time.

The inventive system may allow the user to restore some or all of the data backed up from one device to a different device, even if the target device has a different operating system or has other compatibility differences. In an embodiment, when backing up data, the local software component on the mobile device transforms data from a device-specific format into a universal format. For example, devices which run the Windows Mobile operating system store contact information in a special format. In an exemplary embodiment, the inventive system transforms the data for a contact into a standardized universal XML format. If the universal XML contact data is restored to a Windows Mobile device, the data is transformed back into the native Windows Mobile contact format. If the universal XML contact data is restored to another type of device such as one running the Android operating system, the universal XML contact data is transformed into the native data format supported by that device. Although this example illustrates one data type, all data formats which are not universally supported can be handled by the inventive system. In an embodiment, the server transforms data supplied by the mobile device into a universal format when the data is backed up or when the data is transferred from one device to a device of a different type. In an embodiment, both server-side and device-side transformations can be used if the data transformations would be difficult for a mobile device to perform because of battery, CPU, memory, or other limitations. In an embodiment, transformations are performed by the server to convert data between a first and a second native format when data that has been backed up in the first native format is being transferred to a device which does not support the first native format but does support the second native format.

Figure 18:
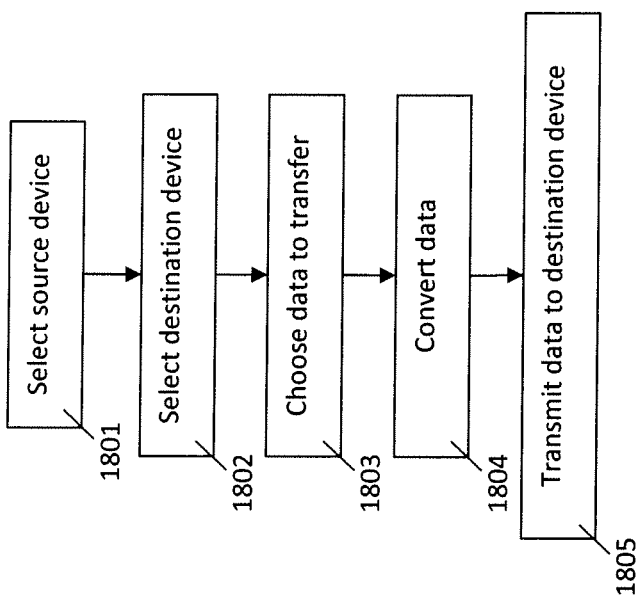
FIG. 18 illustrates a flow chart for transferring data, settings or applications from a source device to a destination device.

In order to facilitate easy migration from one device to another, the server may generate a device migration web page which allows the user to go through a process to transfer data, settings, installed applications, and other information from the user's previous device to the user's new device. This process may also be used to provision a device from a virtual or physical default device so that organizations may easily standardize new or existing devices. In an embodiment with reference to FIG. 18, the process presents to the user a series of steps via the device migration web page that, when finished, result in some or all of the data, settings, or applications from a source device to be transferred to a destination device. First, the server requires that the user identify the source device from which to transfer 1801. The device migration web page contains a list of existing devices associated with the user's account and gives the user the option of adding a new device. If the user installs software on a new device, the process waits for that device to backup its information to the server before proceeding. After the source device is identified by the server, the server presents, via the device migration web page, an interface for the user to select the destination device 1802. The device migration web page contains a list of existing devices associated with the user's account and gives the user the option of adding a new device. If the user chooses to install software on a new device, the process waits for the new device to become active on the server before proceeding. Once the source and destination devices are identified, the server presents to the user, via the remote access web page, an interface for choosing what data, settings, or applications to transfer to the destination device 1803. Once the user has chosen what to transfer, the server queues commands to be sent to the destination device, indicates for the destination device to connect to the server, and transmits the commands to the device when the device connects 1805. In an embodiment, data is converted before it is transmitted to the device 1804. The data may be converted before the commands are queued or after the commands are queued but before the data is transmitted to the device. If the devices run compatible operating systems or the data is in a universal format, the data may be directly transferred without conversion. If the devices run incompatible operating systems, the server may convert the data to make it compatible with the destination device. In an example, if applications are being transferred from the source device to the destination device and the two devices run incompatible operating systems, the application running on the source device would not run on the destination device. The server may reference a database containing application equivalents for different platforms and choose to transfer a version of the application to the destination device that is compatible with the destination device's operating system. If there is not a version of the application available for the destination device, a suitable substitute may be chosen. During the time while the desired information is being sent to the destination device, the device migration web page displays a progress indicator showing the status of the transfer process. When the transfer is finished, the server informs the user, via the device migration web page, that the migration is complete and the destination device is ready to use.

5. Wipe

The user can also instruct the mobile device to wipe the data stored on the mobile device 543. In order to make sure that all of the data on a lost device is backed up before it is wiped, the destruction of stored data may be performed after the mobile device has locked and a backup has been performed. In order to ensure that the data cannot be recovered from the mobile device, the mobile device may write over the entire memory with meaningless data. In an embodiment, the mobile device writes over the memory multiple times to ensure that no residual traces of data are left. In addition to the mobile device's onboard memory, there may be additional components associated with the mobile device which can store data such as removable or non-removable storage devices and Subscriber Identification Modules (often called SIM cards). On storage cards, some mobile devices can store pictures, documents, applications, and other data. On SIM cards, some mobile devices can store contacts, text messages, applications, and other data. In an embodiment, when the mobile device performs a wipe, it erases the data on some or all of the additional components which can store data. If the mobile device is recovered, backed up data can be used to restore some or all of the data that was previously wiped.

6. Other Remote Actions

In an embodiment, the remote access web page allows the user to request that the server instruct the device to record audio from its microphone, video from its camera, or both. The recording may be for a default period of time, the user may specify a time interval to record for, or the user may specify a periodic recording. After the device records audio and/or video, it sends the audio and/or video data to the server. The remote access web page shows recently recorded data uploaded by the device. The remote access web page allows the user to download recorded data as well as view it directly in the web page. In an embodiment, the user may use the remote access web page to stream audio and/or video from the device. Upon receiving a request to stream audio and/or video, the server sends a command to the device which then begins streaming the requested media to a streaming server using a protocol such as RTP (Real-time Transport Protocol). The mobile device encodes the audio and/or video in a compressed format to minimize the data rate required to stream. The remote access web page contains a small application which utilizes a browser component such as Flash from Adobe to allow the user to view the streaming audio and/or video from the device. The streaming server may process the video and/or audio from the mobile device in order to make it compatible with the streaming media display application. In addition, the streaming server may store the streamed audio and/or video from the device for later retrieval by the user. The remote access web page may display previously recorded streams for download by the user.

In an embodiment, the remote access web page allows the user to request that the server instruct the device to take a picture using the device's camera. In an embodiment, the remote access web page allows the user to specify that the device should take pictures periodically at a specified interval. After the device takes a picture, it sends it to the server. The server saves the picture and displays the latest pictures on the remote access web page for viewing or download by the user. The remote access web page may display previous pictures so that the user may view pictures taken by the device over a period of time.

7. Status Reporting

In addition to remote access controls, the remote access web page can provide status information for the requested commands. As discussed, the mobile device transmits reports to the server which indicate the status of commands sent to it. The local software component on the mobile device interprets the commands being sent by the server and reports on the status of the commands. The reports can include the progress of the commands, the completion of the commands and other information pertaining to the mobile device. In an example referencing FIG. 5, the user selected to locate the device, backup data from the device, lock the device, and wipe all data from device. The remote access web page indicates that the server is in contact with the mobile device and communications are OK 560. The mobile device has been locked 564 and the system is 57% complete in backing up data from the device 562. The status of wiping the device 563 is at 0% because the system is waiting for the backup to be completed. The user may stop the wipe by pressing the cancel button 570.

If a device's session with the server is interrupted and not resumed within a given amount of time, the remote access web page will indicate that the communications with the device are lost. The server may automatically attempt to indicate to the device to reconnect or allow the user to request that the server indicate to the device to connect. If the server indicates to the device to reconnect, the remote access web page shows the status of attempts to re-establish communications. When communications are re-established, the remote access web page will again indicate that communications are OK 560 and the remote access commands will resume from the point at which communications were broken.

8. Lost/Stolen Device Functionality

When the device is lost or stolen, it may be desirable for the device to hide the presence and prevent removal of software such as the local software component. In an embodiment, the server can issue a command which puts the device into a lost/stolen mode. When the device is in lost/stolen mode, it may hide any user interface components related to the local software component, prevent removal of the local software component, and report the location of the device and actions performed on the device such as phone calls, text messages, web pages visited, and SIM card changes. The remote access web page may display that the device is lost/stolen. In a further embodiment, the remote access web page displays the location corresponding to the device's location reports on a map and displays a list of the actions performed on the device since it has been in lost/stolen mode. The map may show the location of the device over multiple points in time to convey information regarding movement of the device. In an embodiment, entering lost/stolen mode automatically triggers the local software component on the mobile device to perform certain actions. For example, when in lost/stolen mode, the local software component on the device automatically takes a picture using the device's camera periodically. Alternatively, when in lost/stolen mode, the local software component on the device automatically records audio and/or video from the device. In each case, the device sends data resulting from the automatically performed action(s) to the server. The data is displayed on the remote access web page for view by the user. The remote access web page allows the user to configure what actions, if any, should be performed by the device when it enters lost/stolen mode.

The device may automatically enter lost/stolen mode upon certain events. In an embodiment, the server automatically instructs the local software component on the device to go into lost/stolen mode when the user requests for the server to send a remote access command which is indicative of the device being lost or stolen. Commands such as lock, play sound, locate, wipe, or backup may indicate that the user has lost the device or that the device was stolen. In a further embodiment, the actions configured to be automatically performed when a device enters lost/stolen mode will only be performed as a result of the user explicitly commanding the device to enter lost/stolen mode and not as a result of the device entering lost/stolen mode because the user requested a command that is indicative of the device being lost or stolen. In an embodiment, if the SIM is changed or removed on the mobile device, the device will automatically enter lost/stolen mode and notify the server of the lost/stolen mode state. In an embodiment, the device will automatically enter lost/stolen mode if it is detected to be in a location area that has been pre-defined by the user to put the device into lost/stolen mode. The location area may be defined by selecting an area(s) that the device must stay inside of or by selecting an area(s) that the device may not enter. If the device violates this location area selection requirement, the server automatically puts the device into lost/stolen mode. The user may use the remote access web page to define the location area(s). In an embodiment, the actions configured to be automatically performed when the device enters lost/stolen mode will only occur when the device enters lost/stolen mode as a result of events, such as the SIM being replaced or the device entering the pre-defined lost/stolen location area, occurring.

In an embodiment, the user can use the remote access web page to manually request for the server to instruct the mobile device to turn on lost/stolen mode. When the device is in lost/stolen mode, the user may use the remote access web page to request for the server to instruct the mobile device to turn off lost/stolen mode. In an embodiment, if the device is locked and the user enters valid authentication information such as a password on the device to unlock it, the device will automatically turn off lost/stolen mode and notify the server of the lost/stolen mode state.

When the device enters lost/stolen mode, the server may notify the user or an administrator via an email or other alert. In an embodiment, the email sent to the user when the device automatically enters lost/stolen mode has two links, one with text that corresponds to the user still having possession of the device and another with text corresponding to the user not having possession of the device. If the user follows the link corresponding to not having possession of the device, the server displays the remote access web page for the user to perform any desired actions. If the user follows the link corresponding to having possession of the device, the server turns off lost/stolen mode for the device and informs the device of the lost/stolen mode state. In an embodiment, the server sends the email when the device is in lost/stolen mode and the user has not turned it off after a period of time. In an exemplary embodiment, when the user locks the device from the remote access web page, lost/stolen mode is automatically turned on. If the user does not turn off lost/stolen mode, the server emails the user after a predetermined time period such as 1 hour. After receiving the email, the user may click on the link corresponding to having recovered the device or the user may click the link corresponding to not having recovered the device. If the device has not been recovered, the user may use the remote access web page to wipe the device and prevent any sensitive information on the device from being used for illegitimate purposes.

In an embodiment, the email sent to the user in the case of a device being in lost/stolen mode includes information about how to contact the phone's service provider to prevent fraudulent use of the phone's service. The service provider information may be generated based on information provided by the device during the server's previous communications with the local software component on the device.

When the device is lost or stolen, the user may need a replacement as soon as possible. If the user is traveling or otherwise unable to obtain a replacement device easily, it is advantageous for the system to present the user with opportunities to replace the device. In an embodiment, the email sent to the user in the case of the device being in lost/stolen mode includes offers for the user to purchase a replacement mobile device. In an embodiment, the server generates a device replacement web page that includes offers for the user to purchase a replacement mobile device. The offers may be selected based on the user's current mobile device type, the user's country of origin, the user's previous mobile operator, and other information which is available to the server. In order to provide the user with the best pricing, availability, and delivery time, the system interfaces with third party vendors or the user's mobile operator to determine what offers to present to the user. The device replacement web page allows the user to filter offers by factors such as phone operating system, presence or absence of a physical keyboard, network type, and network operator. In an embodiment, the user provides a location by entering information such as an address, country, or postal code on the device replacement web page. The server interfaces with one or more mobile device vendors to determine options available for the user to obtain a new device nearby the provided location. The server displays a map showing where the user may obtain a replacement device nearby the provided location and optionally, the pricing and availability of different replacement devices. In an embodiment, the server displays estimated or guaranteed delivery times for vendors to deliver a replacement device to the location provided by the user. In an embodiment, the server generates the device replacement web page for a user without an account on the server.

Because both the server software and the local software component can alter the device's state, it is desirable for the local software component to be able to report the device's current state to the server. The state of the device includes whether or not it is locked, whether or not it is in lost/stolen mode, and other state information that may be changed by the server software or the local software component on the device. In an embodiment, the local software component on the device reports state information to the server periodically or upon certain events such as session initiation. In an example, if the device is locked because of a command from the server and the user enters a password directly on the device to unlock it, the server needs to be notified that the device has been unlocked. The next time the device connects to the server, it transmits its state information which updates the device's lock state stored on the server.

If the device cannot communicate with the server, it is possible that the user has commanded the device to enter lost/stolen mode or to perform a remote action but the device does not receive the command. In an embodiment, the local software component on the device automatically locks the device when the device has been out of network coverage for a period of time, the device's SIM is removed or changed, the device has been turned off for a period of time, or upon other events that would render the device unable to receive commands from the server. The device is automatically unlocked once communications are re-established with the server. If the device is locked and trying to communicate with the server, the user may enter authentication credentials such as a password to unlock the device without having connected to the server. The password may be set using a web page generated by the server or via a user interface on the mobile device.

9. Protection from Unauthorized Access

Figure 16:
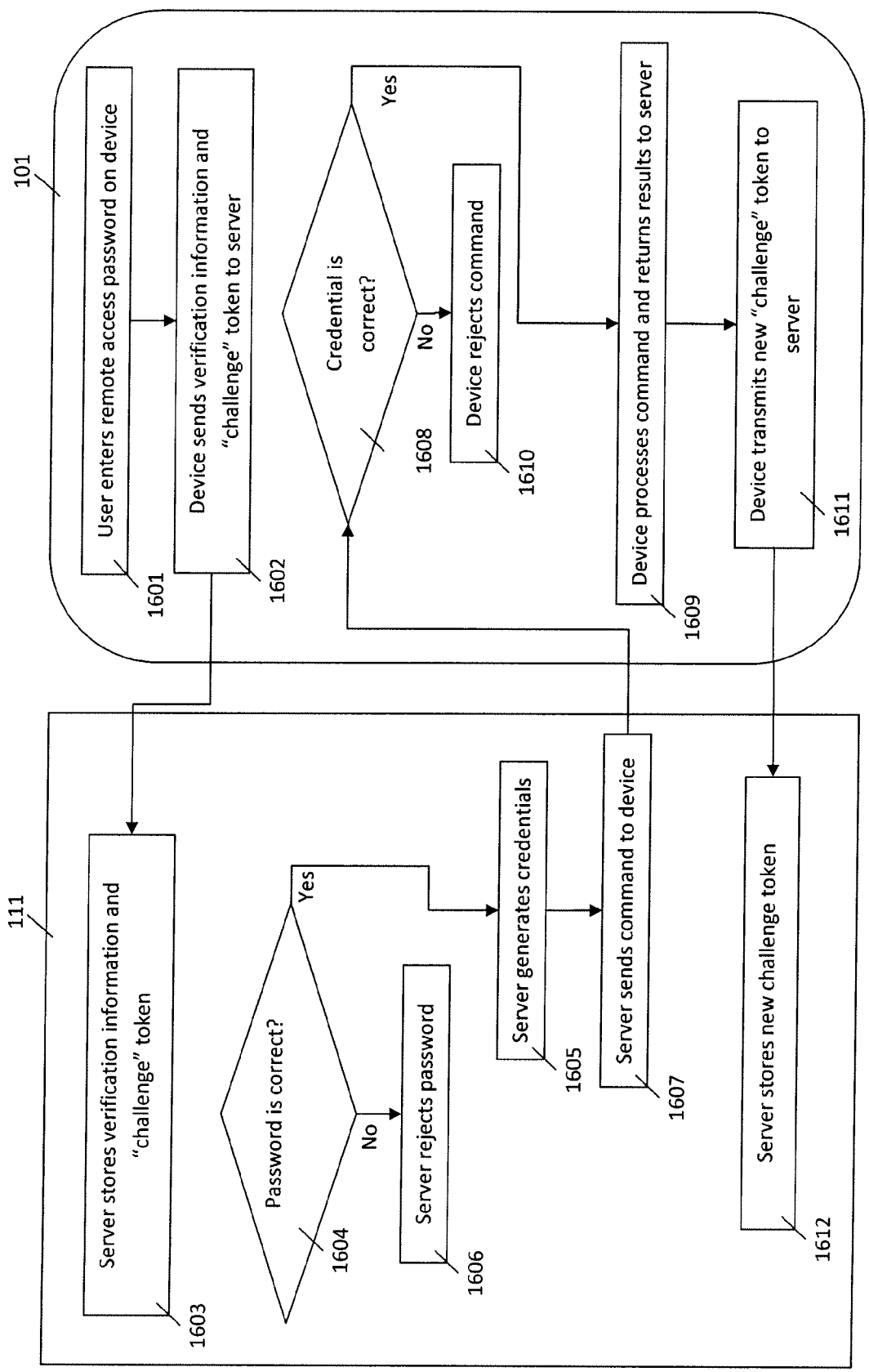
FIG. 16 illustrates a flow chart for securing remote access commands performed on the device.

In order to protect user privacy, the inventive system may be configured so that the local software component 175 on the device 101 only accepts commands from the server that are accompanied with special remote access authentication credentials. In an embodiment with reference to FIG. 16, the server 111 can only generate the remote access authentication credentials in a short period of time with information supplied by the user. The local software component on the device is initially configured with its special remote access authentication credentials. The credentials themselves are not sent to the server. The device generates verification information and a "challenge" token and transmits them to the server 1602. The verification information and "challenge" token are stored by the server 1603. When user-supplied authentication information is received by the server, the server uses the verification information to check whether the user-supplied authentication information is correct 1604. If the authentication information is correct, the server combines the user-supplied authentication information with the "challenge" token to generate the remote access authentication credentials 1605. If the authentication information is not correct, the server does not generate the remote access credentials 1606. When the server has valid authentication credentials, it transmits a command to the device along with the valid credentials 1607. The device receives the command and checks the credential 1608. If the credential is valid, the device processes the command and returns its results to the server 1609. If the credential is not valid, the device rejects the command 1610. If the device requests that the server change the "challenge" token 1611, the server will store the new token and discard the old token 1612. The device may request the "challenge" token to be changed periodically or upon certain events to prevent attacks where previously used credentials are replayed to the device. In a further embodiment, the remote access authentication credential is generated using a special remote access password. The user sets the remote access password on the device 1601. When the remote access password is set on the device, the device generates verification information and a "challenge" token and transmits them to the server 1602. The verification information includes a random salt used for password verification and the result of hashing the password with the verification salt. The "challenge" token is a second random salt used to generate the authentication credential and not equal to the first salt. The server stores the verification information and the "challenge" token 1603. In order for the mobile device to perform an action, the server must supply the command along with the correct authentication credential. The correct authentication credential is the result of hashing the password with the "challenge" salt using an algorithm such as SHA-1. Because the server does not have the original password, it is considered mathematically infeasible for the server to generate the correct authentication credential without the user supplying the correct password, so long as the hash function in use is considered cryptographically effective. Because the server has the verification salt and the expected output of hashing the password with the verification salt, the server can verify whether or not a given password entered by the user is correct. When the user requests a remote access command that requires an authentication credential through the remote access web page, the user is asked to supply the remote access password for the device. The user supplies the remote access password to the server by entering it on the remote access web page and sending the password to the server. The server hashes the password with the verification salt and compares it to the expected verification hash result 1604. If the password is correct, the server hashes the password with the "challenge" salt to build the authentication credential 1605. If the password is incorrect, the server informs the user via the remote access web page 1606. The password is discarded after the authentication credential is generated. The server only temporarily stores the authentication credential while it is sending commands to the device and receiving status from the device corresponding to the secured remote access commands. After the credential is not needed for specific commands requested by the user, it is discarded. After any commands are completed, the software on the mobile device may send a new "challenge" salt to the server 1611 to prevent the server from using the previous authentication credential again. After receiving the new "challenge" salt, the server discards the old "challenge" salt 1612. In an alternative embodiment, the server supplies the remote access web page with the password verification hash, the password verification salt, and the "challenge" salt so that the remote access web page can generate the authentication token without sending the remote access password to the server. When the user enters a password on the remote access web page, software in the web page written in a language such as JavaScript hashes the password with the verification salt and compares it to the expected verification hash result to determine whether or not the password is correct. If the user enters the correct password, the remote access web page generates the authentication credential by hashing the password with the "challenge" salt and sends it to the server. The server can then send the desired remote access command to the device with the correct remote access credential.

10. Multiple-Device Management

Although the present invention has been described for access to and control of a single mobile device by a single user, it is also possible for the invention to be used for control of a group of mobile devices by a group administrator and/or for control of multiple devices belonging to a single user. Rather than displaying a management interface for a single mobile device, a group administrator or user with multiple devices can have access to multiple different mobile devices simultaneously.

In an embodiment, the server generates a multiple-device management web page which allows policy, security, and configuration settings to be changed for a group of devices simultaneously. When a user of the multi-device management web page changes settings for the group, the server sends commands to update the modified settings to each device in the group. The group may contain devices which have different operating systems, hardware capabilities, mobile network types, and other variations. In a further embodiment, the settings commands sent to devices of different types are the same. The local software component on each device interprets each settings command and performs any necessary settings changes appropriate to that device. In an embodiment, the server only sends commands to a device which are appropriate for that device type.

In an embodiment, the multiple-device management web page allows actions to be performed remotely on a group of devices simultaneously. When an action is selected to be performed on a group of devices, the server sends a command to each device present in the group. The multiple-device management web page shows the status of commands for each device (e.g. "3 commands outstanding for this device") and a representation of the overall group's execution status for each command (e.g. "534 of 550 devices successfully completed backup"). The web page may show the devices or number of devices in each stage of command completion (e.g. "Waiting to send command", "Command sent", "Command in progress", "Command finished", "Command Failed"). For commands that return data to the server such as a locate command, the web page may show the locations of each device on a map. In an embodiment, the user of the web page may choose to only display devices that are in a certain geographic area. The area can be defined by selecting a portion of a map. The area can also be defined by specifying a radius and selecting a point on a map or typing the address or name of a location. In an embodiment, locations specified by the user of the web page are stored by the server for repeated use.

In addition to managing a group of devices, an administrator may use the server to access a single device belonging to an individual user. If the device belonging to an individual user is lost or stolen, the user of the device can inform the administrator who can then determine the location of the device. If the user cannot find the mobile device, the administrator can assist the user in locking the device, backing up the data stored on the device, and wiping all data from the device. The administrator can then provide the user with a replacement mobile device which has had the user's data restored onto it.

In an embodiment, a mobile device can be accessed both by its user and a group administrator. The group administrator can determine what permissions the user has to manage the device from the server. For example, the administrator may specify that users can access their devices' backed up data, perform remote actions on their devices, but may not modify their devices' security, policy, or configuration settings. In this case, a user can use the server to perform remote actions on a device without the help of an administrator. By allowing users to perform remote actions on their mobile devices directly without having to go through an administrator, the inventive system may help an organization decrease its number of lost devices and secure lost or stolen devices more quickly, thereby minimizing the possibility of sensitive data being compromised. In an embodiment, the administrator is notified when a user performs missing-device related actions so that the administrator can verify that the missing device was either found or put into a secure state. In an embodiment, multiple sets of management permissions can be defined on the server so that the server provides multiple management interfaces, each specific for different administrative roles. In an example, the server is configured so that a mobile network administrator is able to change security settings for a group of devices, an IT administrator is able to modify policy and remotely perform actions on the group, and a user is able to view backed up data from and remotely perform actions only on his or her mobile device. In an embodiment, the server can be configured to support arbitrary permission grouping for individual devices and groups of devices so as to support many different organizational or cross-organizational use cases. In an embodiment, a given device can be a member of multiple groups, inheriting settings from each group. When settings for a single group are changed, those changes are sent to software on the device. In the case of conflicting setting changes, the server defines a policy by which conflicts are reconciled. For example, disabling device functionality such as Bluetooth overrides the enablement of that functionality. In a further embodiment, the device can have settings defined that override any group settings.

In an embodiment, an administrator can access security status information for a group of mobile devices through a web page generated by the server. In order to monitor the security status of all the mobile devices in a group, the mobile devices can be configured to transmit security status and security event information such as being infected with a virus or receiving a network-based attack to the server. The server then compiles the security information and displays the security status for the group of mobile devices on an administrator's computer that is in communication with the server. By displaying the security status for all mobile devices in the group, the administrator can quickly identify a mobile device that is compromised. If a virus or other severe security event is detected on a mobile device, the administrator will be informed and can take defensive actions to isolate the mobile device to protect other mobile devices and protect the data stored on the compromised mobile device. Additional details of the remote control of the mobile devices are disclosed in co-pending U.S. patent application Ser. No. 12/255,635, "Security Status and Information Display System."

D. Countering Espionage and Terrorism

Lost and stolen devices are the most prevalent and most serious threat facing mobile device deployments today. As government and commercial entities often store data on mobile devices relating to critical infrastructure and of importance to national security, securing lost or stolen mobile devices is of key importance to the interests of the country and specifically, in preventing terrorist threats that benefit from the information stored on mobile devices. Physical threats, such as lost or stolen devices, are intrinsically difficult to deal with because the nature of mobile devices. Mobile devices are not continuously connected to a central network, they are constantly in hostile environments, and they are predisposed to store important and sensitive information. The inventive system significantly bolsters government and commercial entities' ability to prevent sensitive data on mobile devices from falling into the hands of unauthorized parties, such as foreign intelligence agents, terrorist collaborators, and the like. When a device containing sensitive information is lost or stolen, the inventive system provides an administrator with an array of options to deal with the problem. Furthermore, embodiments of the inventive system automatically identify a likely lost or stolen device even before a user may notice it as missing.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto.

What is claimed is:

1. A method for remote control of a target mobile communications device comprising:
    at a server, processing authorization credentials received from a client computer user to determine whether the client computer user is authorized to access the server to issue a request for an action to be performed by the target mobile communications device;
    at the server, and after processing of the authorization credentials, receiving a request for an action to be performed by the target mobile communications device, the request for the action received at the server from the authorized user accessing the server from the client computer;
    transmitting a command from the server to the target mobile communications device, the command corresponding to the received request for the action to be performed by the target mobile communications device;
    in response to the transmitted command, receiving at the server, information about the target mobile communications device;
    interpreting the received information about the target mobile communications device to determine whether the transmitted command was performed or not performed by the target mobile communications device;
    if the interpretation of the received information indicates that the command was performed by the target mobile communications device, providing a first notification from the server to the client computer that the command was performed, the notification formatted to populate a client computer web page containing a request for action status; and
    if the interpretation of the received information indicates that the command was not performed by the target mobile communications device, providing a second notification from the server to the client computer that the command was not performed, the second notification formatted to populate a client computer web page containing a request for action status.

2. The method of claim 1, wherein the request for the action includes locking the target mobile communications device.

3. The method of claim 1, wherein the request for the action includes emitting a sound from the target mobile communications device.

4. The method of claim 1, wherein the request for the action includes backing up data stored on the target mobile communications device.

5. The method of claim 1, wherein the request for the action includes deleting data stored on the target mobile communications device.

6. The method of claim 1, wherein the request for the action includes two or more tasks selected from the group: locking the target mobile communications device, emitting a sound, backing up data, deleting data and requesting a location and wherein the request for the action includes an order in which the two or more tasks are to be performed.

7. The method of claim 1, wherein the request for the action includes a request for a location of the target mobile communications device and the information includes location-related information of the target mobile communications device.

8. The method of claim 7, wherein the location of the target mobile communications device includes GPS coordinates for the target mobile communications device and information pertaining to a map related to the GPS coordinates which are transmitted by the server for display on the client computer.

9. The method of claim 7, wherein the information includes radio identification and signal information which indicate the location of the target mobile communications device.

10. A method for remotely determining a physical location of a target mobile communications device comprising:
    at a server, processing authorization credentials received from a client computer user to determine whether the client computer user is authorized to access the server to issue a request for determining the physical location of the target mobile communications device;
    at the server, and after processing of the authorization credentials, receiving a request to determine the physical location of the target mobile communications device from the authorized user accessing the server from the client computer;
    transmitting a locate command from the server to the target mobile communications device, the locate command corresponding to the request to determine the physical location received from the authorized user; and
    if the locate command was performed by the target mobile communications device, receiving at the server information concerning the physical location of the target mobile communications device; and
    transmitting from the server to the client computer location information concerning the physical location of the target mobile communications device.

11. The method of claim 10 wherein (i) the transmitting a locate command includes the transmission of a plurality of locate commands over a time interval; (ii) the receiving at the server information includes receiving a plurality of information concerning the physical location of the target mobile communications device; and (iii) the transmitting from the server to the client computer location information includes a plurality of location information concerning the physical location of the target mobile communication device at the different times that the target mobile communications device was accessed during the time interval.

12. The method of claim 10 wherein the method further comprises, between the receiving at the server information concerning the physical location step and the transmitting from the server to the client computer location information step, the additional step of combining the information received at the server concerning the physical location of the target mobile communications device with target mobile communications device physical location data retrievable from the server to obtain the location information transmitted from the server to the client computer in the last step of the method.

13. A non-transitory computer-readable storage medium having stored thereon a plurality of instructions which, when executed by a processor, cause the processor to perform the steps of a method comprising:
- at a server, processing authorization credentials received from a client computer user to determine whether the client computer user is authorized to access the server to issue a request for an action to be performed by the target mobile communications device;
- at the server, and after processing of the authorization credentials, receiving a request for an action to be performed by the target mobile communications device, the request for the action received at the server from the authorized user accessing the server from the client computer;
- transmitting a command from the server to the target mobile communications device, the command corresponding to the received request for the action to be performed by the target mobile communications device;
- in response to the transmitted command, receiving at the server, information about the target mobile communications device;
- interpreting the received information about the target mobile communications device to determine whether the transmitted command was performed or not performed by the target mobile communications device;
- if the interpretation of the received information indicates that the command was performed by the target mobile communications device, providing a first notification from the server to the client computer that the command was performed, the notification formatted to populate a client computer web page containing a request for action status; and
- if the interpretation of the received information indicates that the command was not performed by the target mobile communications device, providing a second notification from the server to the client computer that the command was not performed, the second notification formatted to populate a client computer web page containing a request for action status.

14. The non-transitory computer readable storage medium of claim 13 wherein the request for the action includes locking the target mobile communications device.

15. The non-transitory computer readable storage medium of claim 13, wherein the request for the action includes emitting a sound from the target mobile communications device.

16. The non-transitory computer readable storage medium of claim 13, wherein the request for the action includes backing up data stored on the target mobile communications device.

17. The non-transitory computer readable storage medium of claim 13, wherein the request for the action includes deleting data stored on the target mobile communications device.

18. The non-transitory computer readable storage medium of claim 13, wherein the request for the action includes two or more tasks selected from the group: locking the target mobile communications device, emitting a sound, backing up data, deleting data and requesting a location and wherein the request for the action includes an order in which the two or more tasks are to be performed.

19. The non-transitory computer readable storage medium of claim 13, wherein the request for the action includes a request for a location of the target mobile communications device and the information includes location-related information of the target mobile communications device.

20. The non-transitory computer readable storage medium of claim 19, wherein the location of the target mobile communications device includes GPS coordinates for the target mobile communications device and information pertaining to a map related to the GPS coordinates which are transmitted by the server for display on the client computer.

21. The non-transitory computer readable storage medium of claim 19, wherein the information includes radio identification and signal information which indicate the location of the target mobile communications device.

22. The non-transitory computer readable storage medium of claim 19 wherein the method further comprises, between the receiving at the server information concerning the physical location step and the transmitting from the server to the client computer location information step, the additional step of combining the information received at the server concerning the physical location of the target mobile communications device with target mobile communications device physical location data retrievable from the server to obtain the location information transmitted from the server to the client computer in the last step of the method.

23. A non-transitory computer-readable storage medium having stored thereon a plurality of instructions which, when executed by a processor, cause the processor to perform the steps of a method comprising:
- at a server, processing authorization credentials received from a client computer user to determine whether the client computer user is authorized to access the server to issue a request for determining the physical location of the target mobile communications device;
- at the server, and after processing of the authorization credentials, receiving a request to determine the physical location of the target mobile communications device from the authorized user accessing the server from the client computer;
- transmitting a locate command from the server to the target mobile communications device, the locate command corresponding to the request to determine the physical location received from the authorized user; and
- if the locate command was performed by the target mobile communications device, receiving at the server information concerning the physical location of the target mobile communications device; and
- transmitting from the server to the client computer location information concerning the physical location of the target mobile communications device.

24. The non-transitory computer readable storage medium of claim 23 wherein (i) the transmitting a locate command includes the transmission of a plurality of locate commands over a time interval; (ii) the receiving at the server information includes receiving a plurality of information concerning the physical location of the target mobile communications device; and (iii) the transmitting from the server to the client computer location information includes a plurality of location information concerning the physical location of the target mobile communication device at the different times that the target mobile communications device was accessed during the time interval.

25. A method for remotely determining a physical location of a target mobile communications device comprising:
- at a server, processing authorization credentials received from a client computer user to determine whether the client computer user is authorized to access the server to request the determination of the physical location of the target mobile communications device;

at the server, and after processing of the authorization credentials, presenting a web page to the client computer to enable the authorized user to enter a request on the web page for the server to determine the physical location of the target mobile communications device;

at the server, receiving the request from the authorized user to determine the physical location of the target mobile communications device;

at the server, transmitting an indication message to the target mobile communication instructing the target mobile communications device to connect to the server;

after the target mobile communications device connects to the server, at the server, transmitting a command to determine the physical location of the target mobile communications device;

at the server, receiving information from the target mobile communications device concerning the physical location of the target mobile communications device;

at the server, reporting the physical location of the target mobile communications device by generating a second web page that contains the physical location, the second web page being accessible only to the client computer authorized user that requested the determination of the physical location.

26. The method of claim 25 wherein the method further comprises, between the receiving at the server information concerning the physical location step and the reporting step, the additional step of combining the information received at the server concerning the physical location of the target mobile communications device with target mobile communications device physical location data retrievable from the server to obtain the physical location for reporting in the last step of the method.

27. A non-transitory computer-readable storage medium having stored thereon a plurality of instructions which, when executed by a processor, cause the processor to perform the steps of a method comprising:

at a server, processing authorization credentials received from a client computer user to determine whether the client computer user is authorized to access the server to request the determination of the physical location of the target mobile communications device;

at the server, and after processing of the authorization credentials, presenting a web page to the client computer to enable the authorized user to enter a request on the web page for the server to determine the physical location of the target mobile communications device;

at the server, receiving the request from the authorized user to determine the physical location of the target mobile communications device;

at the server, transmitting an indication message to the target mobile communication instructing the target mobile communications device to connect to the server;

after the target mobile communications device connects to the server, at the server, transmitting a command to determine the physical location of the target mobile communications device;

at the server, receiving information from the target mobile communications device concerning the physical location of the target mobile communications device;

at the server, reporting the physical location of the target mobile communications device by generating a second web page that contains the physical location, the second web page being accessible only to the client computer authorized user that requested the determination of the physical location.

28. The non-transitory computer readable storage medium of claim 27 wherein the method further comprises, between the receiving at the server information concerning the physical location step and the reporting step, the additional step of combining the information received at the server concerning the physical location of the target mobile communications device with target mobile communications device physical location data retrievable from the server to obtain the physical location for reporting in the last step of the method.

* * * * *

UNITED STATES PATENT AND TRADEMARK OFFICE
CERTIFICATE OF CORRECTION

PATENT NO. : 8,467,768 B2
APPLICATION NO. : 12/372719
DATED : June 18, 2013
INVENTOR(S) : Kevin Mahaffey et al.

It is certified that error appears in the above-identified patent and that said Letters Patent is hereby corrected as shown below:

Title Page, Item (75) Inventors, change "James Bergess, Los Angeles, CA (US)" to
--James Burgess, Los Angeles, CA (US)--.

Signed and Sealed this
Twenty-third Day of July, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,467,768 B2  
APPLICATION NO. : 12/372719  
DATED : June 18, 2013  
INVENTOR(S) : Kevin Mahaffey et al.

Page 1 of 1

It is certified that error appears in the above-identified patent and that said Letters Patent is hereby corrected as shown below:

In The Claims

In column 34, claim 11, line 60, delete "target mobile communication device" and insert -- target mobile communications device --.

In column 36, claim 24, lines 60-61, delete "target mobile communication device" and insert -- target mobile communications device --.

In column 37, claim 25, line 13, delete "target mobile communication instructing" and insert -- target mobile communications device instructing --.

In column 38, claim 27, line 15, delete "target mobile communication instructing" and insert -- target mobile communications device instructing --.

Signed and Sealed this  
Nineteenth Day of January, 2016

Michelle K. Lee  
*Director of the United States Patent and Trademark Office*